United States Patent
Chen et al.

(10) Patent No.: US 12,506,203 B2
(45) Date of Patent: Dec. 23, 2025

(54) END COVER ASSEMBLY, BATTERY CELL, BATTERY PACK AND DEVICE

(71) Applicant: CONTEMPORARY AMPEREX TECHNOLOGY (HONG KONG) LIMITED, Hong Kong (CN)

(72) Inventors: Yuanbao Chen, Ningde (CN); Quankun Li, Ningde (CN); Peng Wang, Ningde (CN); Lingyan Jiang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 947 days.

(21) Appl. No.: 17/059,991

(22) PCT Filed: Sep. 30, 2020

(86) PCT No.: PCT/CN2020/119199
§ 371 (c)(1),
(2) Date: Nov. 30, 2020

(87) PCT Pub. No.: WO2021/203642
PCT Pub. Date: Oct. 14, 2021

(65) Prior Publication Data
US 2021/0359365 A1    Nov. 18, 2021

(30) Foreign Application Priority Data
Apr. 9, 2020   (CN) .......................... 202010275768.5

(51) Int. Cl.
*H01M 50/188*   (2021.01)
*H01M 50/152*   (2021.01)
(Continued)

(52) U.S. Cl.
CPC ....... *H01M 50/188* (2021.01); *H01M 50/152* (2021.01); *H01M 50/342* (2021.01); *H01M 50/35* (2021.01); *H01M 2220/20* (2013.01)

(58) Field of Classification Search
CPC ............. H01M 50/342; H01M 50/188; H01M 50/183; H01M 50/668; H01M 50/593;
(Continued)

(56) References Cited

U.S. PATENT DOCUMENTS 3,579,387 A * 5/1971 Voyentzie ........... H01M 50/392
429/55
4,122,243 A * 10/1978 Tsuchida ............. H01M 10/285
429/174
(Continued)

FOREIGN PATENT DOCUMENTS

| CN | 203812931 U | 9/2014 |
| CN | 105009326 A | 10/2015 |

(Continued)

OTHER PUBLICATIONS

Chinese Office Action directed to related Chinese Patent Application No. 202080049965.3, mailed Oct. 31, 2022; 34 pages.
(Continued)

*Primary Examiner* — Jessie Walls-Murray
(74) *Attorney, Agent, or Firm* — STERNE, KESSLER, GOLDSTEIN & FOX P.L.L.C.

(57) ABSTRACT

The present disclosure relates to an end cover assembly, a battery cell, a battery pack and a device. The end cover assembly includes a cover assembly, a terminal assembly, a sealing piece and a first connected flow channel. The cover assembly is provided with an installation hole, and the installation hole penetrates through the cover assembly along an axial direction of the installation hole; the terminal assembly is installed in the installation hole; the sealing
(Continued)

piece is configured to seal the installation hole; the first connected flow channel is arranged in at least one of the terminal assembly and the cover assembly, and the first connected flow channel is configured as follows: when the sealing of the sealing piece is invalid, the first connected flow channel enables the inside and the outside of the housing to be communicated through the installation hole.

7 Claims, 15 Drawing Sheets

(51) Int. Cl.
*H01M 50/342* (2021.01)
*H01M 50/35* (2021.01)

(58) Field of Classification Search
CPC . H01M 50/152; H01M 50/543; H01M 50/172
See application file for complete search history.

(56) References Cited

U.S. PATENT DOCUMENTS

| | | | |
|---|---|---|---|
| 5,856,041 A | 1/1999 | Inoue et al. | |
| 2005/0014064 A1* | 1/2005 | Matsubara | H01M 50/562 429/180 |
| 2012/0196164 A1 | 8/2012 | Kim | |
| 2013/0111248 A1* | 5/2013 | Ghesquiere | G06F 1/3237 713/324 |
| 2015/0207118 A1* | 7/2015 | Guen | H01M 50/184 429/54 |
| 2015/0380712 A1 | 12/2015 | Tsunaki et al. | |
| 2018/0287104 A1* | 10/2018 | Urushihara | H01M 50/188 |
| 2021/0399373 A1* | 12/2021 | Ko | H01M 50/197 |

FOREIGN PATENT DOCUMENTS

| | | |
|---|---|---|
| CN | 205376589 U | 7/2016 |
| CN | 206574778 U | 10/2017 |
| CN | 207490000 U | 6/2018 |
| CN | 208873781 U | 5/2019 |
| CN | 209374499 U | 9/2019 |
| CN | 209401723 U | 9/2019 |
| CN | 209626268 U | 11/2019 |
| JP | 2006-202560 A | 8/2006 |
| JP | 2007-335107 A | 12/2007 |
| JP | 2010238653 A | 10/2010 |
| JP | 2019036504 A | 3/2019 |
| JP | 2019083151 A | 5/2019 |
| WO | 2014033822 A1 | 3/2014 |
| WO | 2014118965 A1 | 8/2014 |

OTHER PUBLICATIONS

Chinese Office Action directed to related Chinese Patent Application No. 202010275768.5, mailed Oct. 31, 2022; 24 pages.
First Office Action for Chinese Patent Application No. 202080049965.3, Chinese Patent Office, mailed on Jul. 5, 2022, 24 pages.
Search Report for International Application No. Chinese Patent Application No. 2020102757685, Chinese Patent Office, mailed on Jul. 14, 2022, 5 pages.
First Office Action for Chinese Patent Application No. 202010275768.5, Chinese Patent Office, mailed on Jul. 21, 2022, 16 pages.
Notice of Reasons for Refusal Issued by JPO for JP 2022-560275, mailed on Nov. 24, 2023, 2 pages.

* cited by examiner

B-B

C-C

END COVER ASSEMBLY, BATTERY CELL, BATTERY PACK AND DEVICE

CROSS-REFERENCE TO RELATED APPLICATIONS

This disclosure claims priority to Chinese Patent Application No. 202010275768.5 filed Apr. 9, 2020, the disclosures of which are hereby incorporated in their entirety by reference.

FIELD OF THE INVENTION

The present disclosure relates to the field of batteries, in particular to an end cover assembly, a battery cell, a battery pack and a device.

DESCRIPTION OF RELATED ART

Owing to such advantages as high energy density and environmental friendliness, secondary batteries are widely used in mobile phones, notebook computers and other electronic devices. In recent years, in order to cope with environmental problems, gasoline price problems and energy storage problems, the application of secondary batteries has been rapidly expanded to petro-electric hybrid vehicles, electric vehicles and energy storage systems.

To draw the electric energy inside a secondary battery to the outside, an installation hole will be formed on a top cover of the battery. Since electrolyte is filled inside the secondary battery, to prevent electrolyte from leaking to the outside to cause safety accidents, a sealing piece will be used in the related technology to seal the installation hole. After the secondary battery is assembled, a testing instrument is utilized to detect the sealing performance of the sealing piece.

The inventor found that, at least the following problem exists in the related technology: when the testing instrument detects that the sealing performance is qualified, the secondary battery still has the problem of air leakage or liquid leakage after the secondary battery is used for a period of time, thereby influencing the safety performance of the secondary battery.

SUMMARY OF THE INVENTION

The present disclosure provides an end cover assembly, a battery cell, a battery pack and a device, to optimize the structure of the end cover assembly.

Embodiments of the present disclosure provide an end cover assembly, comprising:

a cover assembly, provided with an installation hole, wherein the installation hole penetrates through the cover assembly along an axial direction of the installation hole;

a terminal assembly, installed in the installation hole;

a sealing piece, configured to seal the installation hole; and a first connected flow channel, wherein the first connected flow channel is arranged in at least one of the terminal assembly and the cover assembly; and one end of the first connected flow channel is communicated with the installation hole, and the other end is communicated with the outside.

In some embodiments, the terminal assembly comprises:

a terminal main body, penetrating through the installation hole; and a terminal extending part, extending outwards from the peripheral surface of the terminal main body, and fixed on a side, along the axial direction, of the cover assembly.

In some embodiments, the sealing piece is arranged between the terminal main body and an inner wall of the installation hole, and the terminal main body and the inner wall of the installation hole jointly squeeze the sealing piece, to seal the installation hole.

In some embodiments, the first connected flow channel is arranged on a surface, adjacent to the cover assembly, of the terminal extending part, and is configured to be a groove.

In some embodiments, one end of the first connected flow channel is communicated with the installation hole, and the other end of the first connected flow channel extends to an edge of the terminal extending part.

In some embodiments, the cover assembly comprises:

a cover plate; and a first insulating member, fit with the cover plate and arranged between the terminal extending part and the cover plate; wherein the installation hole penetrates through the cover plate and the first insulating member along the axial direction of the installation hole;

wherein, the first connected flow channel is arranged on the surface, adjacent to the terminal extending part, of the cover plate, and is configured to be a concave groove; and/or, the first connected flow channel is arranged on the surface of the first insulating member, and is configured to be a concave groove.

In some embodiments, one end of the first connected flow channel is communicated with the installation hole, and extends outside the terminal extending part towards the direction far away from the installation hole.

In some embodiments, two terminal extending parts are available, the two terminal extending parts comprise a first extending part and a second extending part, and the first extending part and the second extending part are respectively arranged at two sides, along the axial direction, of the cover assembly; and the sealing piece is at least partially arranged outside the installation hole, and is arranged between the first extending part and the cover assembly, and the first extending part and the cover assembly jointly squeeze the sealing piece to seal the installation hole.

In some embodiments, the first connected flow channel is arranged on the surface, adjacent to the cover assembly, of the second extending part, and is configured to be a concave groove.

In some embodiments, one end of the first connected flow channel is communicated with the installation hole, and the other end of the first connected flow channel extends to an edge of the second extending part.

In some embodiments, the cover assembly comprises:

a cover plate, wherein the installation hole penetrates through the cover plate along an axial direction of the installation hole;

wherein, the first connected flow channel is arranged on the surface, adjacent to the second extending part, of the cover plate, and is configured to be a concave groove.

In some embodiments, one end of the first connected flow channel is communicated with the installation hole, and the other end of the first connected flow channel extends to the outside of the second extending part.

Embodiments of the present disclosure further provide a battery cell, comprising the end cover assembly provided in any technical solution of the present disclosure.

Embodiments of the present disclosure further provide a battery pack, comprising the battery cell provided in any technical solution of the present disclosure, and the battery cell provides electric energy.

Embodiments of the present disclosure further provide a device which uses a battery pack as a power source, comprising the battery pack provided by any technical solution of the present disclosure.

When the end cover assembly is in a using state, one side, along an axial direction of the installation hole, of the end cover assembly is the inside of the battery cell, and the other side, along the axial direction, of the end cover assembly is the outside of the battery cell. As to the end cover assembly provided in the above technical solution, a first connected flow channel is arranged, when the sealing of the sealing piece is invalid, the first connected flow channel enables two sides, along the axial direction of the installation hole, of the cover assembly to be communicated, such that the inside of the battery cell is communicated with the outside of the battery cell, that is, in the above technical solution, a flow channel which realizes detection is arranged on the battery cell, through the flow channel, whether the battery cell is false sealed when the sealing of the sealing piece is invalid is recognized, thereby improving the quality and performance of the battery cell.

The present disclosure provides an end cover assembly, configured to close a housing of the battery cell, comprising:

a cover assembly, provided with an installation hole, wherein the installation hole penetrates through the cover assembly along an axial direction of the installation hole;

a terminal assembly, installed in the installation hole;

a sealing piece, configured to seal the installation hole; and a first connected flow channel, arranged in at least one of the terminal assembly and the cover assembly, wherein the first connected flow channel is configured to enable the inside and the outside of the housing to be communicated through the installation hole when the sealing of the sealing piece is invalid.

When the end cover assembly is in a using state, one side, along an axial direction of the installation hole, of the end cover assembly is the inside of the housing, and the other side, along the axial direction, of the end cover assembly is the outside of the housing. As to the end cover assembly provided in the above technical solution, a first connected flow channel is arranged, when the sealing of the sealing piece is invalid, the first connected flow channel and the installation hole are cut-through, the first connected flow channel itself is also cut-through, and the installation hole itself is also cut-through, such that the inside of the battery cell is communicated with the outside of the battery cell. In the above technical solution, a first connected flow channel which realizes detection is arranged on the battery cell, through the first connected flow channel, the phenomenon of false sealing of the battery cell is broken when the sealing of the sealing piece is invalid, thereby improving the quality and performance of the battery cell.

In some embodiments, the terminal assembly comprises a terminal main body and a first terminal extending part, wherein the terminal main body penetrates through the installation hole; the first terminal extending part extends outwards from the peripheral surface of the terminal main body, and is fixed on the outer side, along the axial direction, of the cover assembly;

the cover assembly comprises a cover plate and a first insulating member, wherein at least part of the first insulating member is arranged between the first terminal extending part and the cover plate; and the installation hole comprises a first hole segment and a second hole segment, wherein the first hole segment penetrates through the cover plate along the axial direction, and the second hole segment is communicated with the first hole segment and penetrates through the first insulating member along the axial direction.

As to the end cover assembly adopting the above structure, the structure is more compact and reliable.

In some embodiments, wherein the sealing piece is arranged between the terminal main body and the hole wall of the first hole segment, and the terminal main body and the hole wall of the first hole segment jointly squeeze the sealing piece to seal the installation hole. When the above structure is adopted, the sealing ring is effectively fixed.

In some embodiments, wherein the first connected flow channel is arranged between the first insulating member and the cover plate. The above technical solution effectively breaks the false sealing formed between the first insulating member and the cover plate.

In some embodiments, wherein one end of the first connected flow channel is communicated with the first hole segment, and the other end is communicated with the outside of the housing. The above technical solution effectively breaks the phenomenon of false sealing.

In some embodiments, wherein the first connected flow channel is arranged between the first insulating member and the first terminal extending part. The above technical solution effectively breaks the false sealing formed between the member and the first terminal extending part.

In some embodiments, wherein one end of the first connected flow channel is communicated with the second hole segment, and the other end is communicated with the outside of the housing. In the above technical solution, the first connected flow channel is reasonable in structure, and the phenomenon of false sealing will be effectively broken.

In some embodiments, the end cover assembly further comprises:

a first penetrating structure, arranged between the first insulating member and the terminal main body, wherein the first connected flow channel is communicated with the first hole segment through the first penetrating structure. The above technical solution effectively breaks the false sealing formed between the first insulating member and the terminal main body.

In some embodiments, wherein the first penetrating structure penetrates through the hole wall of the second hole segment along an axial direction, and is configured to be a concave part which is concave towards the direction far away from the terminal main body. In the above technical solution, the first penetrating structure is convenient for processing.

In some embodiments, wherein the first connected flow channel is configured to be a groove or a rough surface. In the above technical solution, processing is facilitated.

In some embodiments, wherein at least part of the sealing piece is arranged between the terminal main body and the hole wall of the second hole segment, and the first terminal extending part and the cover plate jointly squeeze, along the axial direction, the part, arranged between the terminal main body and the hole wall of the second hole segment, of the sealing piece. Through the above technical solution, effective installation and fixation of the sealing piece are realized.

In some embodiments, wherein the first connected flow channel is arranged between the first insulating member and the cover plate; and/or, the first connected flow channel is arranged between the first insulating member and the first terminal extending part. In the above technical solution, according to different set positions of the first connected flow channel, false sealing between the first insulating member and the cover plate and false sealing between the first insulating member and the first terminal extending part are effectively broken.

In some embodiments, wherein one end of the first connected flow channel is communicated with the second hole segment, and the other end is communicated with the outside of the housing. In the above technical solution, the structure of the first connected flow channel is reasonable.

In some embodiments, wherein the terminal member further comprises a second terminal extending part which extends outwards from the peripheral surface of the terminal main body, and the second terminal extending part is fixed on the inner side, along the axial direction, of the cover plate;

the cover member further comprises a second insulating member, and at least part of the second insulating member is arranged between the second terminal extending part and the cover plate; and the installation hole further comprises a third hole segment, and the third hole segment is communicated with the first hole segment and penetrates through the second insulating member along the axial direction. In the above technical solution, the structure of the end cover member is richer and the performance is better.

In some embodiments, wherein at least part of the sealing piece is arranged between the terminal main body and the hole wall of the third hole segment, and the second terminal extending part and the cover plate jointly squeeze, along the axial direction, the part, arranged between the terminal main body and the hole wall of the third hole segment, of the sealing piece. In the above technical solution, effective installation and fixation of the sealing piece are realized.

In some embodiments, wherein the first connected flow channel is arranged between the first insulating member and the cover plate. In the above technical solution, the setting manner of the first connected flow channel is more reasonable.

In some embodiments, one end of the first connected flow channel is communicated with the third hole segment, and the other end is communicated with the inside of the housing.

In some embodiments, the sealing piece is arranged between the terminal main body and the hole wall of the first hole segment; and the end cover assembly further comprises:

a second connected flow channel, arranged in at least one of the second terminal extending part and the second insulating member, or, arranged between the second insulating member and the cover plate;

wherein the second connected flow channel is configured to enable the inside of the housing to be communicated with the third hole segment.

In some embodiments, at least part of the sealing piece is arranged between the second terminal extending part and the hole wall of the third hole segment; and the end cover assembly further comprises:

a second connected flow channel, arranged in at least one of the second terminal extending part and the second insulating member, to break the sealing between the second terminal extending part and the second insulating member, such that the inside of the housing is communicated with the third hole segment.

In some embodiments, the end cover assembly further comprises: a second penetrating structure, arranged between the second insulating member and the terminal main body, to break the sealing between the second insulating member and the terminal main body.

In some embodiments, wherein the second penetrating structure penetrates through the hole wall of the third hole segment along an axial direction, and is configured to be a concave part which is concave towards the direction far away from the terminal main body.

Embodiments of the present disclosure further provide a battery cell, comprising a housing and the end cover assembly provided in any technical solution of the present disclosure, wherein the housing is provided with an opening, and the end cover assembly closes the opening.

Embodiments of the present disclosure further provide a battery pack, comprising the battery cell provided in any technical solution of the present disclosure.

Embodiments of the present disclosure further provide a power device, comprising the battery pack provided in any technical solution of the present disclosure.

A manufacturing device of a battery cell further provided in embodiments of the present disclosure comprises:

a housing providing module, configured to provide a housing, wherein the housing is provided with an opening; and an end cover providing module, configured to provide an end cover assembly, wherein the end cover assembly closes the opening, and the end cover assembly comprises:

a cover assembly, provided with an installation hole, wherein the installation hole penetrates through the cover assembly along an axial direction of the installation hole;

a terminal assembly, installed in the installation hole;

a sealing piece, configured to seal the installation hole; and a first connected flow channel, arranged in the terminal assembly and/or the cover assembly, wherein the first connected flow channel is constructed as follows: when the sealing of the sealing piece is invalid, the first connected flow channel enables the inside and the outside of the housing to be communicated through the installation hole.

A manufacturing method of a battery cell still further provided by embodiments of the present disclosure comprises the following steps:

providing a housing, wherein the housing is provided with an opening; and providing an end cover assembly, wherein the end cover assembly closes the opening, and the end cover assembly comprises:

a cover assembly, provided with an installation hole, wherein the installation hole penetrates through the cover assembly along an axial direction of the installation hole;

a terminal assembly, installed in the installation hole;

a sealing piece, configured to seal the installation hole; and a first connected flow channel, arranged in the terminal assembly and/or the cover assembly, wherein the first connected flow channel is constructed as follows: when the sealing of the sealing piece is invalid, the first connected flow channel enables the inside and the outside of the housing to be communicated through the installation hole.

DESCRIPTION OF THE INVENTION

The technical solutions provided in the present disclosure will be elaborated in more details below in combination with FIG. 1 to FIG. 36.

Figure 2:
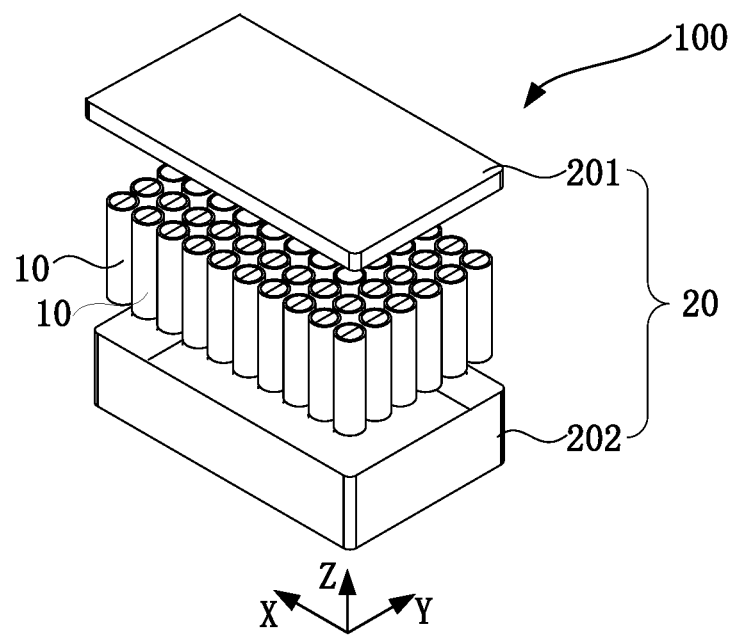
FIG. 2 is an exploded schematic diagram of a battery pack provided in some embodiments of the present disclosure.

In order to more clearly describe the technical solutions of each embodiment of the present disclosure, a coordinate system is established in FIG. 2, and subsequent description of each orientation of the battery pack 100 is based on the coordinate system. Please refer to FIG. 2, and X-axis is a length direction of the battery pack 100. Y-axis is vertical to the X-axis in a horizontal plane, and Y-axis represents a width direction of the battery pack 100. Z-axis is vertical to the plane formed by X-axis and Y-axis. Z-axis represents a height direction of the battery module. In the description of the present disclosure, terms like "upper" and "lower" are both relative to the Z-axis. The length direction of the box 20 is consistent with the length direction of the battery pack 100, the width direction of the box 20 is consistent with the width direction of the battery pack 100, and the height direction of the box 20 is consistent with the height direction of the battery pack 100.

In the description of the embodiments of the present disclosure, it should also be noted that, unless otherwise stipulated and defined definitely, such terms as "installed" and "connected" should be understood in their broad sense, e.g., the connection is a fixed connection, a detachable connection or an integral connection; and is direct connection or is indirect connection. For those skilled in the art, the specific meanings of the above terms in the present disclosure are understood according to specific conditions.

In the description of the present disclosure, it should be understood that, the orientation or positional relationship indicated by such terms as "top", "bottom", "inner" and "outer" is the orientation or positional relationship based on the accompanying drawings. Such terms are merely for the convenience of description of the present disclosure and simplified description, rather than indicating or implying that the device or element referred to must be located in a certain orientation or must be constructed or operated in a certain orientation, therefore the terms cannot be understood as a limitation to the protection contents of the present disclosure.

Figure 3:
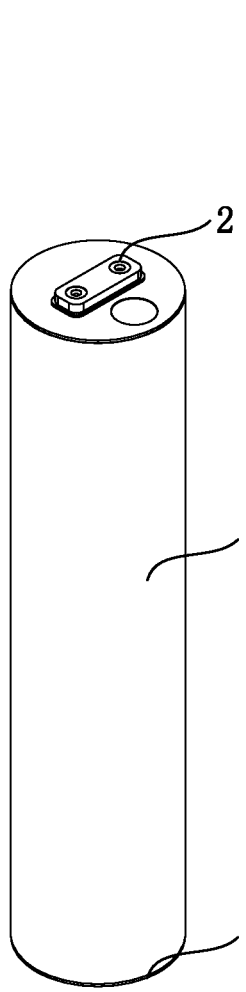
FIG. 3 is a three-dimensional schematic diagram of a battery cell provided in some embodiments of the present disclosure.
Figure 4:
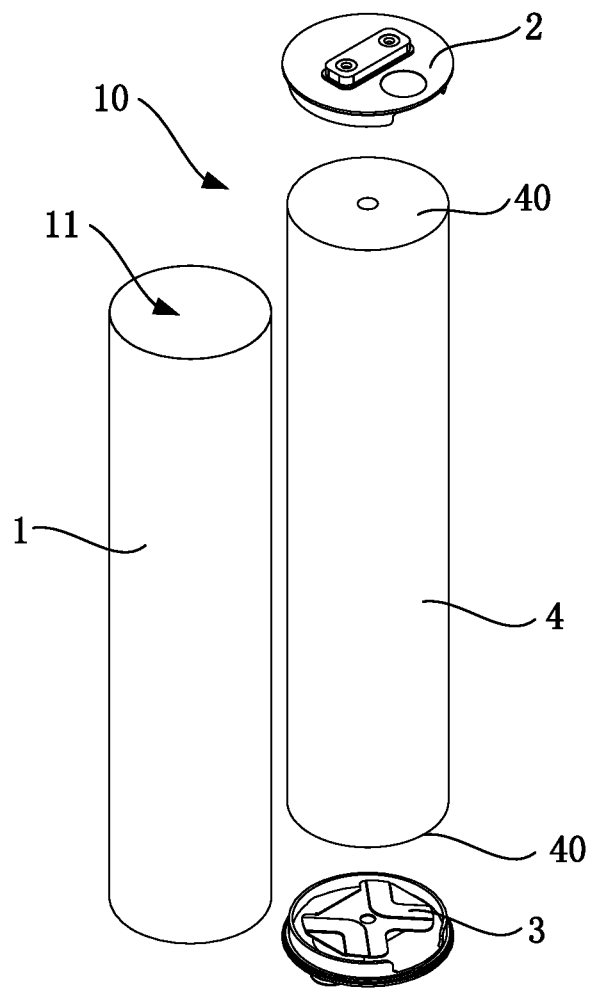
FIG. 4 is an exploded schematic diagram of a battery cell provided in some embodiments of the present disclosure.

Please refer to FIG. 2 to FIG. 4, in the related technology, the battery cell 10 is internally injected with electrolyte. The inventor found that, the battery cell 10 leaks at a plurality of positions, one position is an injection hole which may possibly leak liquid, while another position is a gap between the cover plate 513 and the terminal main body 521 which may possibly leak liquid. In the related technology, only reasons and solutions of liquid leakage at the injection hole are analyzed. In the actual using process of the product, another phenomenon also exists, that is, when the product leaves factory, the product passes the sealing detection requirement, however, after the product is used for a period of time, the product leaks liquid. After long-term creative efforts, the inventor found that: when the sealing of the sealing piece 53 between the cover plate 513 and the terminal main body 521 is invalid or when the sealing piece 53 is omitted to be installed, since some parts in the end cover assembly 5 of the battery cell 10 adopts a plastic material, the plastic material has a certain compression deformation amount. Compression deformation of the plastic material will lead to false sealing of the battery cell 10. That is, in fact, the part needing to be sealed of the battery cell 10 is not sealed, however, after the plastic material is deformed, the whole battery cell 10 will be in a sealed state, that is, in a false sealed state. During detection when a product leaves the factory, since the battery cell 10 is not in an actual working condition, therefore, the above phenomenon of false sealing exits, such that the battery cell 10 satisfies the sealing detection requirement when the product leaves the factory, however, normal using requirement of the product is not satisfied. In the technical solution provided in the present disclosure, whether the end cover assembly 5 of the battery cell 10 is false sealed will be recognized, thereby greatly reducing the occurrence possibility of the above conditions, and improving the performance of the battery cell 10.

Technical solutions of embodiments of the present disclosure will be introduced in detail below.

Figure 1:
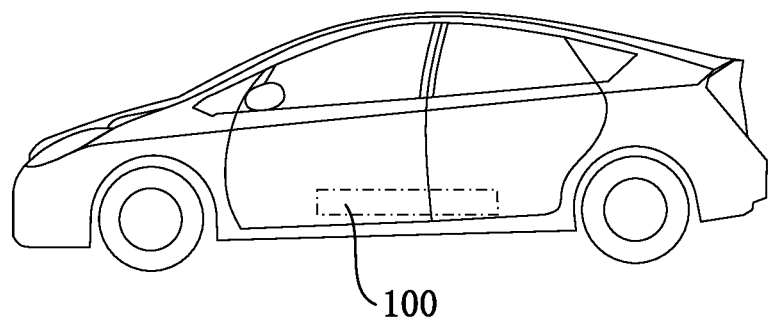
FIG. 1 is a structural schematic diagram of a vehicle provided in some embodiments of the present disclosure.

Please refer to FIG. 1, some embodiments of the present disclosure provide a device which uses a battery pack 100 as a power source. The device comprises a battery pack 100. The device is for example new energy vehicles, ships, intelligent electric cabinets, etc. As a power supply component, the battery pack 100 provides the required electric energy for various electric elements of the device.

Please refer to FIG. 2, in some embodiments, the battery pack 100 comprises one or more battery modules. The battery modules are electrically connected with each other, for example, they are connected in series or in parallel or in series and parallel, to realize the required electric performance parameters of the battery pack 100.

Still refer to FIG. 2, each battery module comprises one or a plurality of battery cells 10. The plurality of battery cells 10 are set in rows, and one or a plurality of battery cells 10 are set according to requirements. The battery cells 10 are electrically connected with each other, for example, they are connected in parallel or in series or in series and parallel, to realize the required electric performance parameters.

Please refer to FIG. 2, and the arrangement manner of each battery cell 10 of the battery pack 100 will be introduced below.

In some embodiments, each battery cell 10 of the battery pack 100 is arranged along a length direction X of the box 20. Along a width direction of the battery pack 100, that is, the Y-axis direction, six rows of battery cell assemblies are arranged. During actual applications, other number of rows are set. According to requirements, in the height direction of the battery pack 100, that is, in the Z-axis direction in FIG. 2, one or a plurality of layers of battery cells are set.

Please refer to FIG. 3 to FIG. 8, some implementation manners of the battery cell 10 will be introduced below.

Some embodiments of the present disclosure provide a battery cell 10, comprising a housing 1, an electrode assembly 4, a positive end cover assembly 2 and a negative end cover assembly 3.

Figure 5:
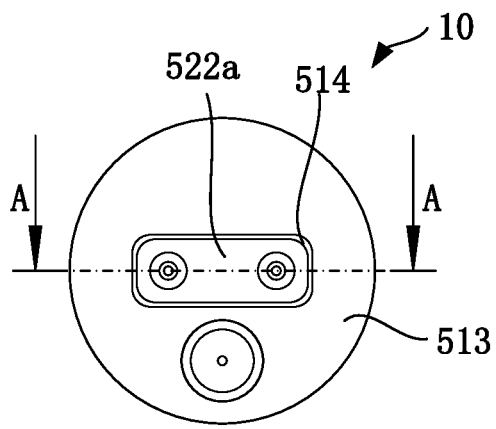
FIG. 5 is a top view schematic diagram of a battery cell provided in some embodiments of the present disclosure.
Figure 6:
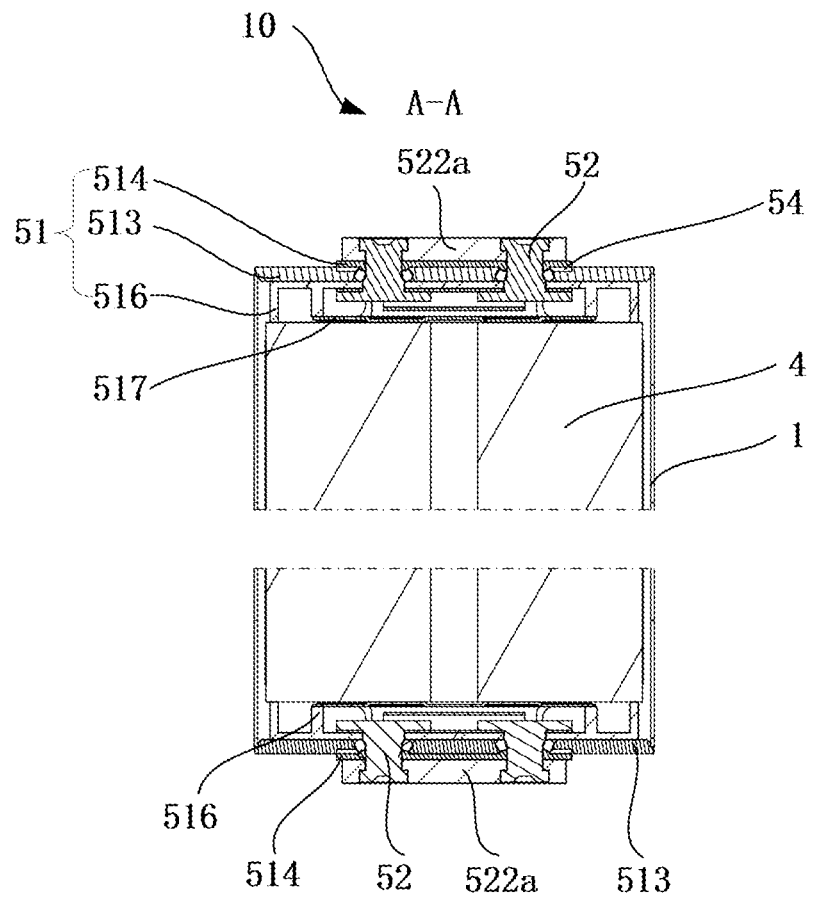
FIG. 6 is a sectional view schematic diagram of A-A in FIG. 5.

Please refer to FIG. 4 to FIG. 6, and the housing 1 is provided with a cavity 11. Two ends of the housing 1 are both open. The electrode assembly 4 is installed in the cavity of the housing 1. A positive end cover assembly 2 is arranged at the opening part at one end of the housing 1, to close the opening at one end of the housing 1, moreover, the positive end cover assembly 2 is electrically connected with the positive polar ear 40 of the electrode assembly 4. The negative end cover assembly 3 is arranged at another end of the housing 1, to close the opening at another end of the housing 1, moreover, the negative end cover assembly 3 is electrically connected with the negative polar ear 40 of the electrode assembly 4.

Figure 7:
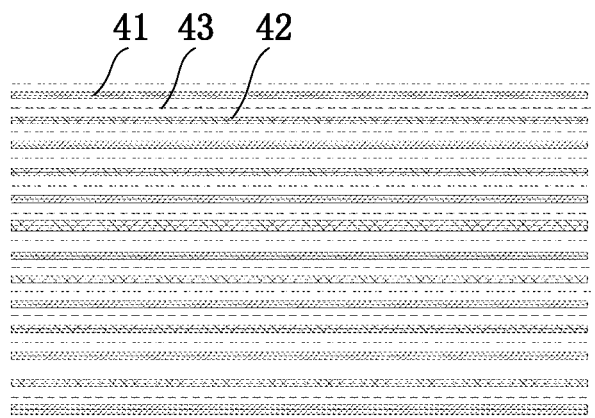
FIG. 7 is a structural schematic diagram of a laminated electrode assembly.
Figure 8:
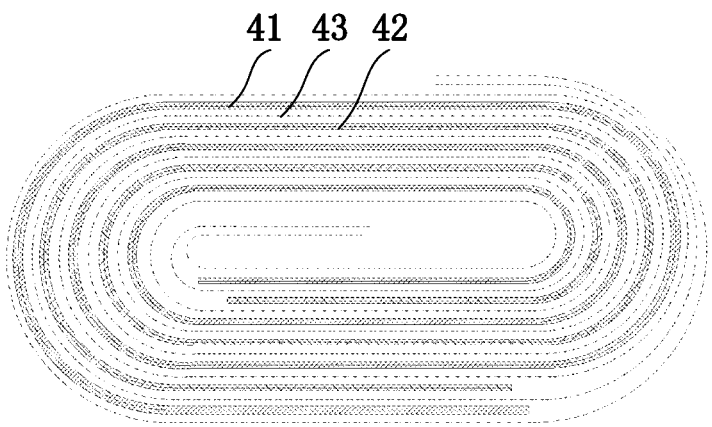
FIG. 8 is a structural schematic diagram of a winding electrode assembly.

The manufacturing methods of the electrode assembly 4 comprise a laminated type and a winding type. As shown in FIG. 7, the laminated electrode assembly 4 is to cut the positive pole piece 41, the negative pole piece 42 and the diaphragm 43 into specified size, and then superimpose the positive pole piece 41, the diaphragm 43 and the negative pole piece 42 into an electrode assembly 4. As shown in FIG. 8, the winding electrode assembly 4 is to wind the positive pole piece 41, the negative pole piece 42 and the diaphragm 43. In some embodiments of the follow-up text, in the battery cell 10, a winding electrode assembly 4 is taken as an example, then the housing 1 is also cylindrical. The end cover assemblies 5 are roughly all circular, to match with the opening shapes at two ends of the housing 1.

At least one of the positive end cover assembly 2 and the negative end cover assembly 3 adopts the implementation manner of the end cover assembly 5 introduced in the following text, that is, a first connected flow channel 54 is arranged in the end cover assembly 5. A detailed introduction will be given below according to different positions at which the first connected flow channel 54 is arranged.

Please refer to FIG. 9 to FIG. 12, and some embodiments of the present disclosure provide an end cover assembly 5, the end cover assembly 5 comprises a cover assembly 51, a terminal assembly 52, a sealing piece 53 and a first connected flow channel 54. The first connected flow channel 54 is arranged in at least one of the terminal assembly 52 and the cover assembly 51. One end of the first connected flow channel 54 is communicated with the installation hole 512, and the other end is communicated with the outside. The so-called outside refers to the outside of the battery cell 10 after the end cover assembly 5 is used in the battery cell 10.

Figure 9:
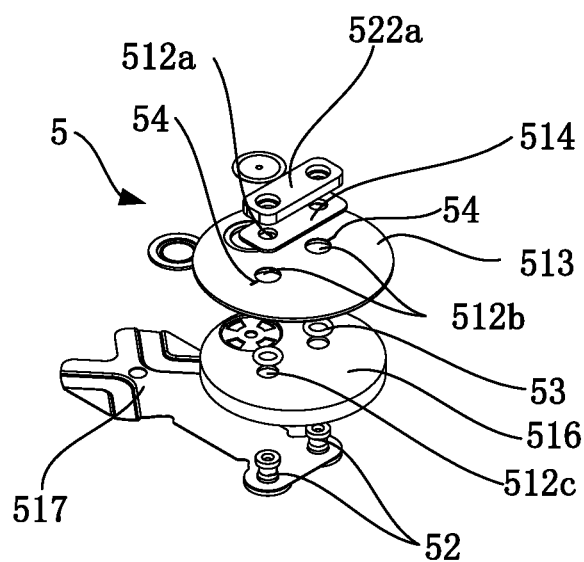
FIG. 9 is an exploded schematic diagram of an end cover assembly in which a first connected flow channel is arranged on the cover plate provided in some embodiments of the present disclosure.

In some embodiments, with the direction illustrated in FIG. 9 as an example, the cover assembly 51 comprises a first insulating member 514, a cover plate 513 arranged below the first insulating member 514, and a second insulating member 516 arranged below the cover plate 513. The cover assembly 51 is provided with an installation hole 512, and the installation hole 512 penetrates through the cover assembly 51 along an axial direction AX of the cover assembly 51. That is, the installation hole 512 penetrates through the first insulating member 514, the cover plate 513 and the second insulating member 516.

Please refer to FIG. 9 to FIG. 12, in some embodiments, the installation hole 512 comprises three communicated segments: a second hole segment 512a, a first hole segment 512b and a third hole segment 512c. Wherein the second hole segment 512a is arranged in the first insulating member 514, the first hole segment 512b is arranged in the cover plate 513, and the third hole segment 512c is arranged in the second insulating member 516.

Figure 10:
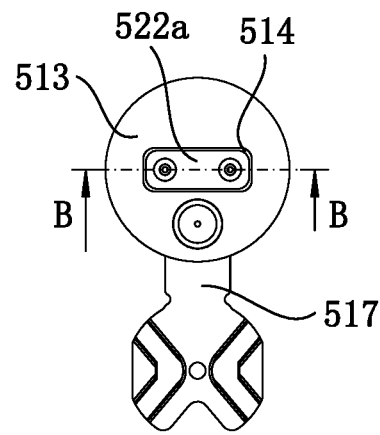
FIG. 10 is a top view schematic diagram of an end cover assembly illustrated in FIG. 9.
Figure 11:
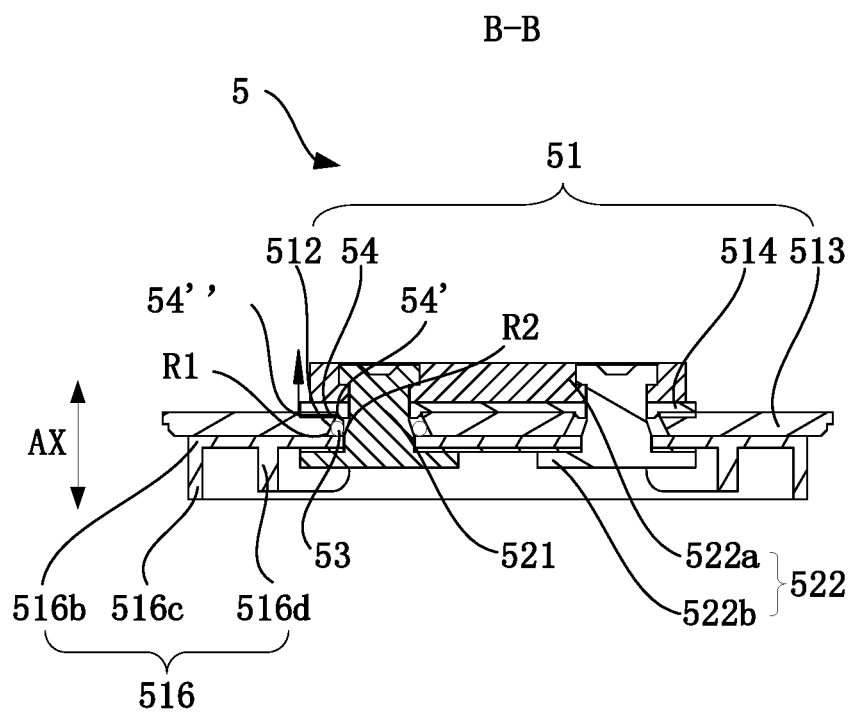
FIG. 11 is a sectional schematic diagram of B-B of FIG. 10.
Figure 12:
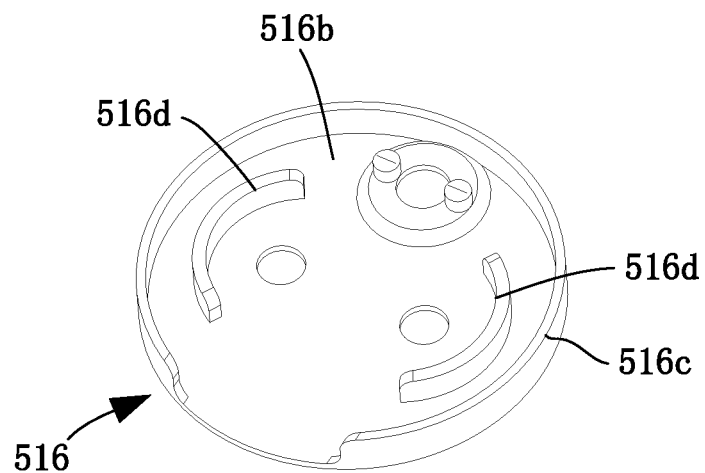
FIG. 12 is a three-dimensional schematic diagram of a first insulating member in FIG. 9.
Figure 13:
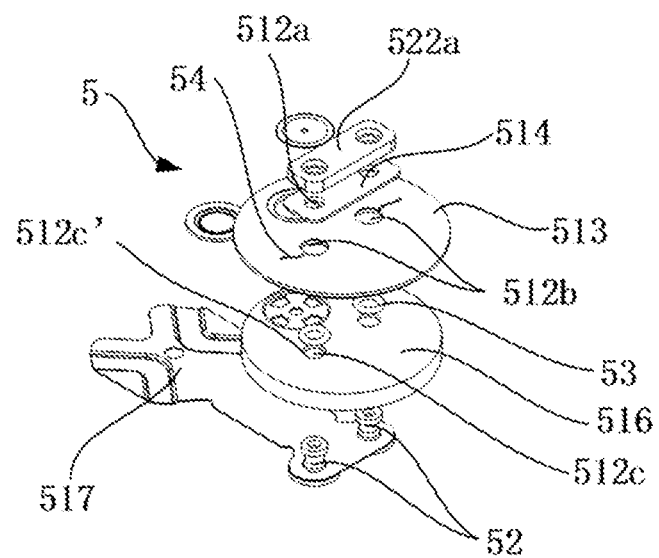
FIG. 13 is a three-dimensional schematic diagram of an end cover assembly in which a first connected flow channel is an arc groove provided in still some embodiments of the present disclosure.

The number of the installation hole 512 is consistent with the number of the terminal main body 521 of the terminal assembly 52 introduced in detail in the following text. In some embodiments, the terminal assembly 52 comprises a terminal main body 521, or comprises more than two terminal main bodies 521. If the end cover assembly 5 is used as a positive end cover assembly 2, then the end cover assembly 5 comprises two positive terminal main bodies 521. If the end cover assembly 5 is used a negative end cover assembly 3, then the end cover assembly 5 comprises two negative terminal main bodies 521. FIG. 9 to FIG. 11 illustrate implementation manners of two terminal main bodies 521. In these embodiments, the electrode assembly 4 adopts a winding molding manner. A structure with two terminal main bodies 521 is adopted, and two installation holes 512 are arranged symmetrically or asymmetrically about the center of the first insulating member 514. The structure in which the terminal assembly 52 adopts two terminal main bodies 521 prevent such phenomenon of rotation relative to the housing 1 after the end cover assembly 5 is installed.

Please refer to FIG. 9 to FIG. 12, and the terminal assembly 52 is installed in the installation hole 512. The terminal assembly 52 comprises a terminal main body 521 and a terminal extending part 522. The terminal main body 521 penetrates through the installation hole 512. Two terminal extending parts 522 are available, and the two terminal extending parts 522 are respectively arranged at two ends, along an axial direction, of the terminal main body 521. Two terminal extending parts 522 and the terminal main body 521 are in an independent connection relationship, and do not influence each other. For example, one of the terminal extending parts 522 and the terminal main body 521 are integrated, the other terminal extending part 522 is fixedly connected with the terminal main body 521 through such manners as rivet connection. Each terminal extending part 522 extends outwards from the peripheral surface of the terminal main body 521, that is, the radial size of the terminal extending part 522 is larger than the radial size of the terminal main body 521. Each terminal extending part 522 is fixed on one side, along the axial direction, of the cover assembly 51. With the direction illustrated in FIG. 11 as an example, the terminal extending part 522 arranged below and the terminal main body 521 are integrated, and the terminal extending part is also called a second extending part 522b. The terminal extending part 522 arranged above is a terminal pressing plate, and the terminal pressing plate is fixedly connected with the terminal main body 521 through rivet connection. The terminal pressing plate is also called a first extending part 522a. The material of the terminal pressing plate adopts a metal conducting material, such as aluminum, etc.

Please continue to refer to FIG. 9 to FIG. 12, the second extending part 522b is electrically connected with the polar ear 40 of the electrode assembly 4, and the first extending part 522a is configured to be electrically connected with other parts, for example, other battery cells 10.

Please refer to FIG. 9 to FIG. 12, and the first insulating member 514 adopts a rectangular thin-plate structure. The second hole segment 512a is arranged in the first insulating member 514. In those embodiments illustrated in FIG. 9 to FIG. 11, the first insulating member 514 is not provided with a first connected flow channel 54. In some embodiments, the first connected flow channel 54 is arranged in at least one of the two surfaces of the first insulating member 514.

The material of the first insulating member 514 adopt from: polypropylene (PP for short), polycarbonate (PC for short), polyfluoroalkoxy (PFA for short), polyvinyl chloride (PVC for short), polyethylene (PE for short), polyethylene terephthalate (PET for short) and other insulating and electrolyte-resistant materials.

Please refer to FIG. 9 to FIG. 12, the cover plate 513 is arranged between the first insulating member 514 and the second insulating member 516, and the second insulating member 516 and the first insulating member 514 jointly clamp the cover plate 513. The second insulating member 516 is arranged on a side, facing towards the electrode assembly 4, of the cover plate 513, and the first insulating member 514 is arranged on a side, far away from the electrode assembly 4, of the cover plate 513. The cover plate 513 is configured to be a circular thin plate. The cover plate 513 is provided with a first hole segment 512b of the installation hole 512, and the first hole segment 512b is installed with a sealing piece 53. The second insulating member 516, the first insulating member 514 and the sealing piece 53 are jointly matched, to insulate and isolate the cover plate 513 and the terminal main body 521, prevent short circuit of the positive and negative poles, and realize firm installation of the terminal main body 521.

Please continue to refer to FIG. 9 to FIG. 12, and the sealing piece 53 is configured to enable the installation hole 512 to be sealed. In some embodiments, the sealing piece 53 is arranged between the terminal main body 521 and the inner wall of the first hole segment 512b of the installation hole 512, and the terminal main body 521 and the inner wall of the first hole segment 512b of the installation hole 512 jointly squeeze the sealing piece 53, to seal the installation hole 512. The inner wall of the first hole segment 512b of the installation hole 512 is provided with a first inclined surface R1, the terminal main body 521 is provided with a second inclined surface R2, and the first inclined surface R1 is set to be relative to the second inclined surface R2. The sealing piece 53 is arranged between the first inclined surface R1 and the second inclined surface R2, such that the first inclined surface and the second inclined surface squeeze the sealing piece 53. Through joint squeezing of the first inclined surface R1 and the second inclined surface R2, the sealing effect of the sealing piece 53 is realized.

The sealing piece 53 adopts an O-shaped ring, the O-shaped ring is installed in the first hole segment 512b, arranged in the cover plate 513, of the installation hole 512, and the O-shaped ring is arranged between the terminal main body 521 and the cover plate 513, to play a role of preventing leakage of the electrolyte inside the battery cell 10 through the installation hole 512. A hole is arranged in the middle of the sealing piece 53. The terminal main body 521 penetrates through the third hole segment 512c and the hole of the sealing piece 53 of the above text, and then penetrates through the second hole segment 512a of the first insulating member 514.

As introduced above, if the installation of the sealing piece 53 is not in place, the sealing piece 53 is invalid, and the sealing piece 53 is omitted to be installed, the first insulating member 514 will lead to false sealing of the battery cell 10. The false sealed battery cell 10 satisfies the sealing performance detection requirements when the product leaves the factory, however, during actual use, leakage will occur. To recognize the phenomenon, in some embodiments, the cover plate 513 is provided with a first connected flow channel 54. The first connected flow channel 54 enables two sides, along an axial direction, of the cover assembly 51 to be communicated. When the end cover assembly 5 is used, the side, along the axial direction, of the cover assembly 51 is the inside of the battery cell 10, and the other side, along the axial direction, of the cover assembly 51 is the outside of the battery cell 10. The first connected flow channel 54 enables the two sides, along the axial direction, of the cover assembly 51 to be communicated, that is, the inside of the battery cell 10 is communicated with the outside of the battery cell 10. That is, in the above technical solution, a detection flow channel is arranged on the battery cell 10, and when the detection flow channel is configured to recognize false sealing of the sealing piece 53, false sealing occurs to the battery cell 10. Invalid sealing of the sealing piece 53 comprises the following conditions: the sealing piece 53 is not installed, the sealing piece 53 is not installed in place, and the sealing piece 53 is aged and invalid.

Under the premise that the cover plate 513 is provided with a first connected flow channel 54, under normal conditions, if the sealing piece 53 is installed in place and the performance is normal, then the sealing piece 53 will block and disconnect the second end from the first end of the installation hole 512, such that the first end and the second end of the installation hole 512 are not communicated. Under this condition, although the first end of the installation hole 512 is directly communicated with the outside or is communicated with the outside under a certain pressure, then the second end of the installation hole 512 is also not communicated with the outside. However, if false sealing caused by invalid sealing piece 53 introduced in the text above occurs, although the first insulating member 514 enables the whole end cover to be in a false sealed state, however, since the cover plate 513 is provided with a first connected flow channel 54, the first connected flow channel 54 enables the inside and the outside of the battery cell 10 to be communicated. Under this condition, when sealing performance of the battery cell 10 is detected, the leakage of the battery cell 10 will be detected through the first connected flow channel 54, thereby being capable of effectively recognizing whether false sealing occurs to the end cover assembly 5 of the battery cell 10. The above detection operation is realized in the production process of the end cover assembly 5, in this way, unqualified end cover assemblies 5 will be recognized in the production step of the end cover assembly 5, such that the subsequent assembly process of the battery cell 10 saves the operation of sealing detection of the battery cell 10, and optimizes the production process of the battery cell 10. Moreover, various disadvantages caused when unqualified end cover assemblies 5 enter the subsequent process steps are also reduced.

The first connected flow channel 54 are set in a plurality of manners. In some embodiments, the first connected flow channel 54 are configured to be a straight groove or an arc groove. In some embodiments illustrated in FIG. 9 to FIG. 12, the first connected flow channel 54 is configured to be a straight groove. In some embodiments illustrated in FIG. 13, the first connected flow channel 54 is configured to be an arc groove.

In some embodiments, the depth of the first connected flow channel 54 is 0.3 mm to 0.5 mm, for example, 0.3 mm, 0.4 mm, 0.5 mm.

In some embodiments, the depth of the first connected flow channel 54 is 0.3 mm to 1 mm, for example, 0.3 mm, 0.5 mm, 0.7 mm, 0.9 mm, 1 mm.

In some embodiments, one end of the first connected flow channel 54 is communicated with the installation hole 512, and another end of the first connected flow channel 54 extends towards the edge of the cover plate 513, for example, extending to the edge of the vertical projection area of the second extending part 522b.

For the same installation hole 512, the number of the first connected flow channel 54 communicated with the installation hole 512 is one or multiple, and the first connected flow channels 54 are arranged at intervals along the circumferential direction of the installation hole 512. In those embodiments illustrated in FIG. 9 and FIG. 13, two first connected flow channels 54 are available, and the two first connected flow channels 54 are roughly set at an interval of 180°. The length of each first connected flow channel 54 does not exceed the projection area, in the vertical direction, that is, the Z direction of the battery, of the second extending part 522.

Please refer to FIG. 9 to FIG. 12, the second insulating member 516 adopts a ring structure. The third hole segment 512c is arranged in the second insulating member 516. The second insulating member 516 comprises an insulating base plate 516b, and the insulating base plate 516b is circular. The edge of the first surface of the insulating base plate 516b is fixed with a limiting piece, and the shape of the limiting piece is half a circle. A first surface of the insulating base plate 516b faces towards the electrode assembly 4, a second surface of the insulating base plate 516b faces towards the cover plate 513, and the second surface is in parallel with the first surface, and the second surface and the first surface are both maximum extending surfaces of the insulating base plate 516b. The first surface of the insulating base plate 516b is further provided with a supporting piece 516d, and the supporting piece 516d is configured to be cambered. The supporting piece 516d, the insulating base plate 516b and the limiting ring are all set to be concentric. The limiting piece of the second insulating member 516 is propped against the electrode assembly 4. The supporting piece 516d of the second insulating member 516 is propped against a switching piece 517. The switching piece 517 is configured to electrically connect the polar ear 40 of the electrode assembly with the terminal main body 521.

The material of the second insulating member 516 is the same as the material of the first insulating member 514.

Figure 14:
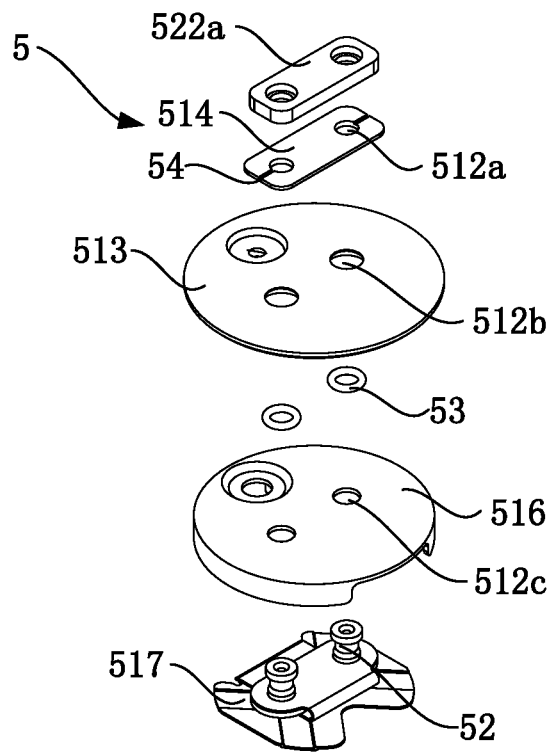
FIG. 14 is an exploded schematic diagram of an end cover assembly in which a first connected flow channel is arranged in the first insulating member provided in another embodiment of the present disclosure.
Figure 15:
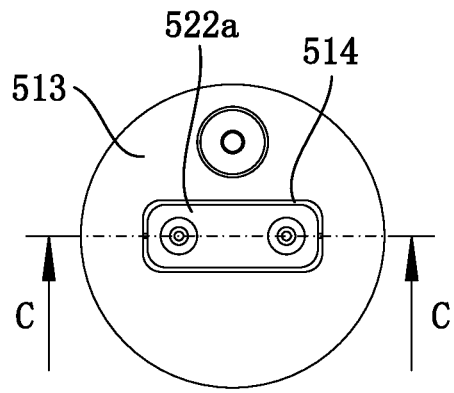
FIG. 15 is a top view schematic diagram of an end cover assembly illustrated in FIG. 14.
Figure 16:
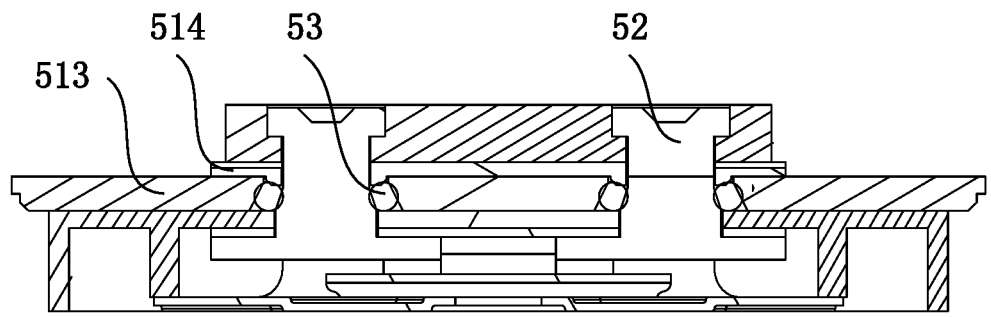
FIG. 16 is a sectional schematic diagram of C-C of FIG. 15.

Please refer to FIG. 14 to FIG. 16, in some other embodiments, the setting position of the first connected flow channel 54 is different from the setting position introduced in the text above. In these embodiments, the first connected flow channel 54 is arranged in the first insulating member 514. The first connected flow channel 54 is arranged on the surface, facing towards the cover plate 513, of the first insulating member 514, that is, the first connected flow channel 54 is arranged on the upper surface of the first insulating member 514, that is, the condition illustrated in FIG. 14 to FIG. 16. Or, the first connected flow channel 54 is arranged on the surface, far away from the cover plate 513, of the first insulating member 514, that is, arranged on the lower surface of the first insulating member 514. Or, the upper and lower surfaces of the first insulating member 514 are both provided with a first connected flow channel 54. It should be noted that, when the first insulating member 514 is provided with a first connected flow channel 54, in some embodiments the cover plate 513 is provided with a first connected flow channel 54, in other embodiments the cover plate 513 is provided with no first connected flow channel 54.

The first connected flow channel 54 arranged on the first insulating member 514 is configured to be a straight groove or an arc groove. For the structure of the straight groove, please refer to the structure illustrated in FIG. 9 to FIG. 12 in the text above. For the structure of the arc groove, please refer to the structure illustrated in FIG. 13.

The number of the first connected flow channel 54 arranged in the first insulating member 514 is be one or multiple, and these first connected flow channels 54 are all communicated with the same installation hole 512. The first connected flow channels 54 are arranged at intervals along a circumferential direction of the installation hole 512.

The length, width and depth of the first connected flow channel 54 introduced above are also applicable to the present embodiment, and will not be repeated redundantly herein.

Figure 17:
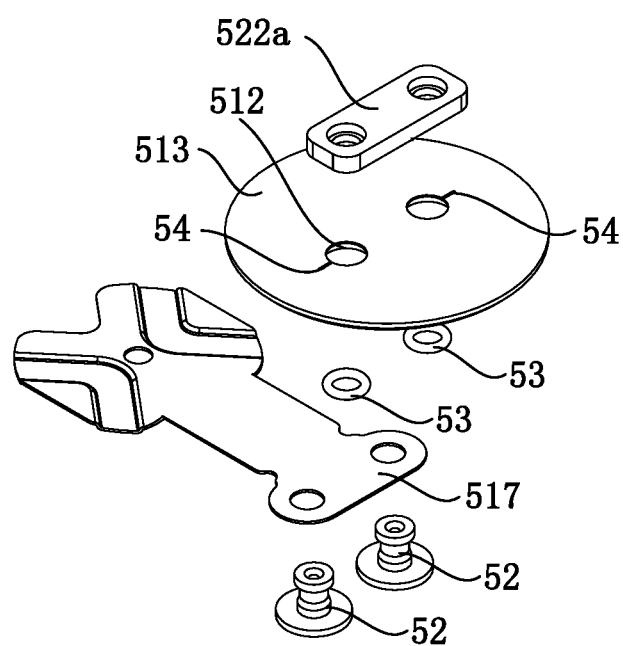
FIG. 17 is an exploded schematic diagram of an end cover assembly provided in some other embodiments of the present disclosure.
Figure 18:
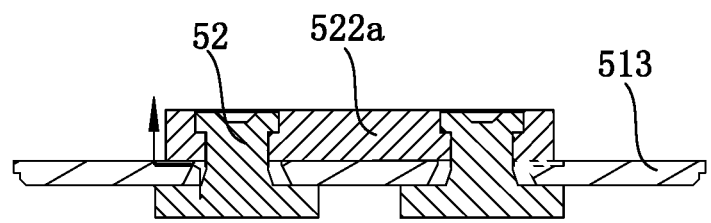
FIG. 18 is a sectional schematic diagram of an end cover assembly illustrated in FIG. 17.
Figure 19:
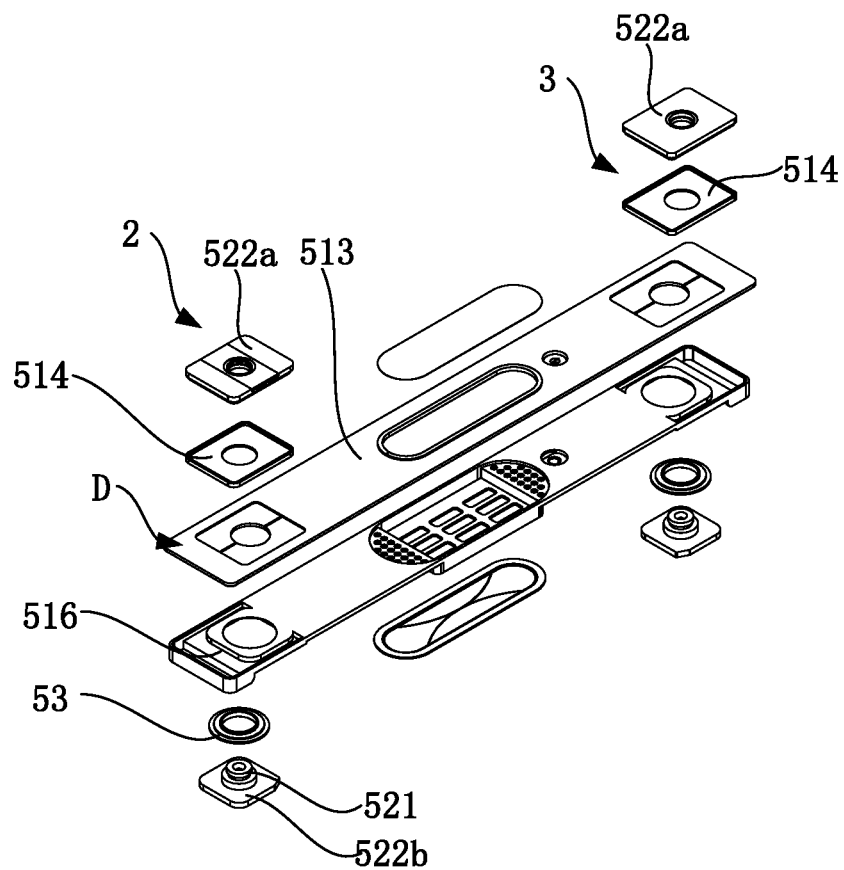
FIG. 19 is an exploded schematic diagram of a single-pole terminal assembly in which a first connected flow channel is arranged on the cover plate provided in still some other embodiments of the present disclosure.

Please refer to FIG. 17 and FIG. 18, the setting manner of the first connected flow channel 54 when the cover assembly 51 adopts other structural forms will be introduced below.

In some embodiments, the cover assembly 51 comprises a cover plate 513, and the cover plate 513 adopts an insulating material. Therefore, the first connected flow channel 54 is arranged on the upper surface or the lower surface of the cover plate 513. In those embodiments illustrated in FIG. 17 and FIG. 18, the first connected flow channel 54 being arranged on the lower surface of the cover plate 513 is taken as an example.

As to the same installation hole 512, the number of the first connected flow channel 54 communicated with the installation hole 512 is one or multiple. The first connected flow channels 54 are arranged at intervals along a circumferential direction of the installation hole 512.

The length, width and depth of the first connected flow channel 54 introduced above are also applicable to the present embodiment, and will not be repeated redundantly herein.

Please refer to FIG. 19 to FIG. 25, some other embodiments of the present disclosure provide an end cover assembly 5 with a single pole. The single-pole end cover assembly 5 means that the number of the terminal main bodies 521 comprised in each end cover assembly 5 is one.

Please refer to FIG. 19 to FIG. 25, the end cover assembly 5 comprises a cover assembly 51, a terminal assembly 52, a sealing piece 53 and a first connected flow channel 54.

The installation hole 512 comprises three communicated segments: a second hole segment 512a, a first hole segment 512b and a third hole segment 512c. Wherein, the second hole segment 512a is arranged in the first insulating member 514, the first hole segment 512b is arranged in the cover plate 513, and the third hole segment 512c is arranged in the second insulating member 516. One installation hole 512 is available, to correspond to the single-pole structure of the terminal assembly 52.

Please continue to refer to FIG. 19 to FIG. 25, the second terminal extending part 522b is electrically connected with the polar ear 40 of the electrode assembly 4, and the first terminal extending part 522a is configured to be electrically connected with other parts, for example, other battery cells 10. The first terminal extending part 522a adopts a rectangular plate structure.

Please still refer to FIG. 19 to FIG. 25, the first insulating member 514 adopts a rectangular thin-plate structure. The second hole segment 512a is arranged in the first insulating member 514. It is understood that, in those embodiments illustrated in FIG. 19 to FIG. 25, although the first insulating member 514 is not provided with a first connected flow channel 54, however, in some other embodiments, the first insulating member 514 is provided with a first connected flow channel 54. The first connected flow channel 54 is arranged on the surface, facing towards the second extending part 522b, of the first insulating member 514 (that is, the upper surface illustrated in FIG. 19); or, the first connected flow channel 54 is arranged on the surface, facing towards the cover plate 513, of the first insulating member 514 (that is, the lower surface illustrated in FIG. 19); or, the upper and lower surfaces of the first insulating member 514 are both provided with a first connected flow channel 54.

Please refer to FIG. 19 to FIG. 25, the cover plate 513 is arranged between the first insulating member 514 and the second insulating member 516, and the second insulating member 516 and the first insulating member 514 jointly clamp the cover plate 513. The second insulating member 516 is arranged on the side, facing towards the electrode assembly 4, of the cover plate 513, and the first insulating member 514 is arrange on the side, far away from the electrode assembly 4, of the cover plate 513. The cover plate 513 is configured to be a rectangular thin plate. The cover plate 513 is provided with a first hole segment 512b of the installation hole 512, and the first hole segment 512b is configured to install the sealing piece 53 and the terminal main body 521.

Figure 20:
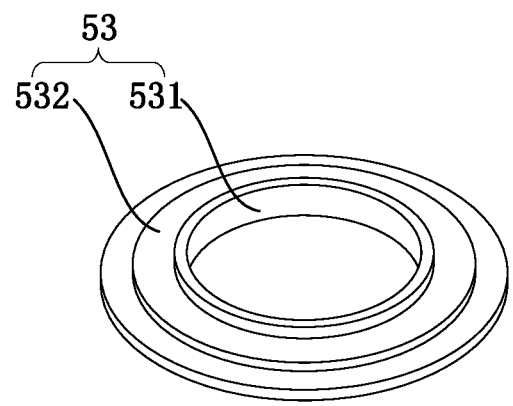
FIG. 20 is a three-dimensional schematic diagram of a sealing piece in FIG. 19.
Figure 21:
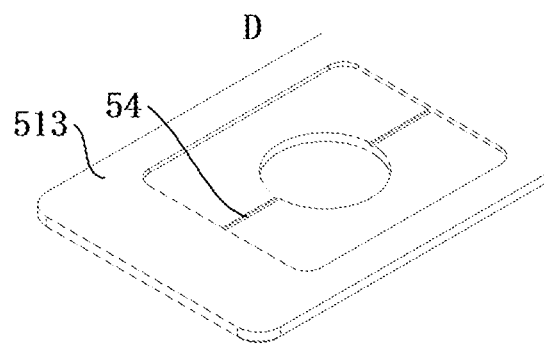
FIG. 21 is a partial enlarged schematic diagram of D of FIG. 19.
Figure 22:
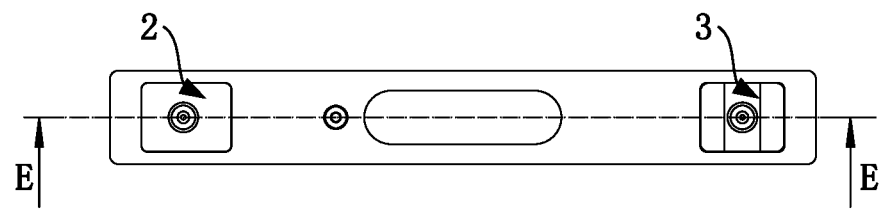
FIG. 22 is a top view schematic diagram of an end cover assembly as illustrated in FIG. 19.
Figure 23:
FIG. 23 is a sectional schematic diagram of E-E of FIG. 22.
Figure 24:
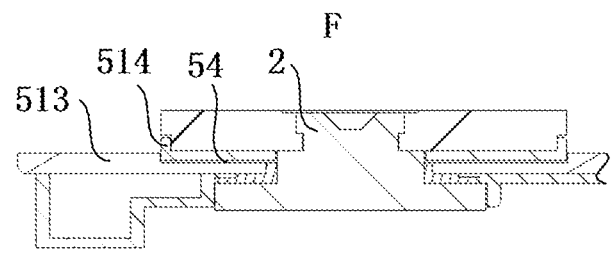
FIG. 24 is an enlarged schematic diagram of end F of FIG. 23.
Figure 25:
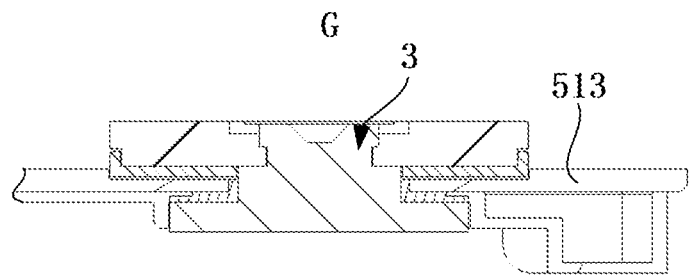
FIG. 25 is an enlarged schematic diagram of end G of FIG. 23.

Please refer to FIG. 20, FIG. 24 and FIG. 25, in these embodiments, the sealing piece 53 adopts a T-shaped sealing ring. The sealing piece 53 comprises an annular part 531 and a sealing part 532, and the annular part 531 is in sealed connection with the sealing part 532. The annular part 531 is arranged in the first hole segment 512b of the installation hole 512, the sealing part 532 is arranged outside the installation hole 512, and the sealing part 532 is pressed tightly by the first extending part 522a of the terminal assembly 52 and the cover plate 513. The sealing part 532 is flat, or is provided with steps, and the sealing part 532 plays a role of sealing. A certain gap exists between the annular part 531 and the inner wall of the first hole segment 512b of the installation hole 512 and the outer wall of the terminal main body 521. The first extending part 522a and the cover assembly 51 jointly squeeze the sealing piece 53 to seal the installation hole 512.

The second insulating member 516, the first insulating member 514 and the sealing piece 53 are jointly matched to insulate and isolate the cover plate 513 and the terminal main body 521, and prevent short circuit of the terminal main body 521 and the cover plate 513, and realize firm installation of the terminal main body 521.

Please refer to FIG. 19 to FIG. 25, the first connected flow channel 54 is arranged on the surface, facing towards the first insulating member 514, of the cover plate 513, that is, the upper surface of the cover plate 513. When a T-shaped sealing ring is adopted, the first connected flow channel 54 is not arranged on the lower surface of the cover plate 513, but arranged on the upper surface of the cover plate 513. The above setting manner not only enable the sealing effect of the T-shaped sealing ring to be normal, but also realize the detection function realized through the first connected flow channel 54 introduced in the text above.

Or, the first connected flow channel 54 is arranged on the surface, facing towards the second insulating member 516, of the cover plate 513, that is, the lower surface of the cover plate 513. Or, the upper and lower surfaces of the cover plate 513 are both provided with a first connected flow channel 54.

Or, the first connected flow channel 54 is arranged on the surface, facing towards the second extending part 522b, of the first insulating member 514, and is configured to be a groove, that is, the first connected flow channel 54 is arranged on the upper surface of the first insulating member 514. Or, the first connected flow channel 54 is arranged on the surface, facing towards the cover plate 513, of the first insulating member 514, and is configured to be a groove or a rough surface, that is, the first connected flow channel 54 is arranged on the lower surface of the first insulating member 514. Or, the upper and lower surfaces of the first insulating member 514 are both provided with a first connected flow channel 54. The so-called rough surface refers to a surface in which the roughness is larger than a set value, and is a flat surface or a non-flat surface. The set value is for example set with the roughness Ra being greater than or equal to 0.8 μm, when the rough surface is amplified for observation, the rough surface is found to be an uneven surface.

It should be noted that, the first connected flow channels 54 on the first insulating member 514 and the cover plate 513 are independent and do not influence each other. A first connected flow channel 54 is arranged simultaneously on the first insulating member 514 and the cover plate 513, and the first connected flow channel 54 is also only arranged on one of the first insulating member 514 and the cover plate 513. The first connected flow channels 54 are all arranged on the downstream of the sealed position of the sealing part 532.

In these embodiments in which the sealing piece 53 adopts a T-shaped sealing ring, for the length, width and depth of the first connected flow channel 54, please refer to the introduction above, which will not be repeated redundantly herein.

In the above technical solution, the first connected flow channel 54 is communicated with the installation hole 512, and the first connected flow channel 54 is arranged in at least one of the terminal assembly 52 and the cover assembly 51. When the sealing of the sealing piece 53 is invalid, the first connected flow channel 54 enables two sides, along an axial direction, of the end cover assembly 5 to be communicated through the installation hole 512, thereby being capable of effectively recognizing the phenomenon of false sealing.

The implementation manner in which the first connected flow channel 54 is arranged in the terminal assembly 52 is introduced below.

The implementation manner in which the terminal assembly 52 comprises two terminal main bodies is firstly introduced. Please refer to FIG. 26 to FIG. 28, in some embodiments, the end cover assembly 5 comprises a cover assembly 51, a terminal assembly 52, a sealing piece 53 and a first connected flow channel 54. The terminal assembly 52 comprises two terminal main bodies 521.

Figure 26:
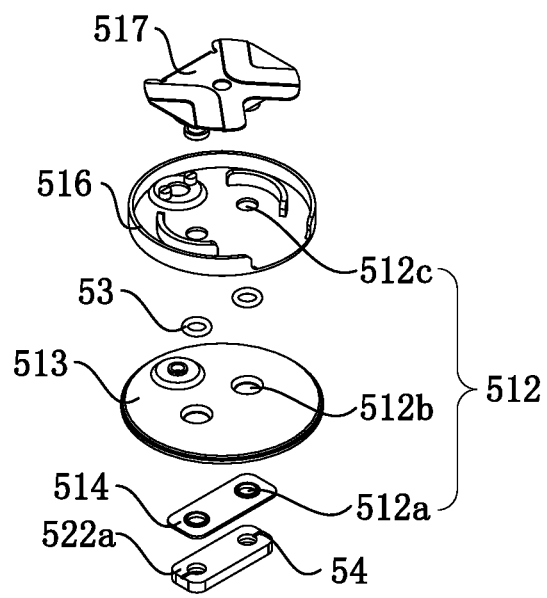
FIG. 26 is an exploded schematic diagram of an end cover assembly in which a first connected flow channel is arranged in the first extending part provided in some embodiments of the present disclosure.

In some embodiments, with the direction illustrated in FIG. 26 as an example, the cover assembly 51 comprises a first insulating member 514, a cover plate 513 arranged above the first insulating member 514, and a second insulating member 516 arranged above the cover plate 513. The cover assembly 51 is provided with an installation hole 512, and the installation hole 512 penetrates through the cover assembly 51 along an axial direction. That is, the installation hole 512 penetrates through the first insulating member 514, the cover plate 513 and the second insulating member 516.

Figure 27:
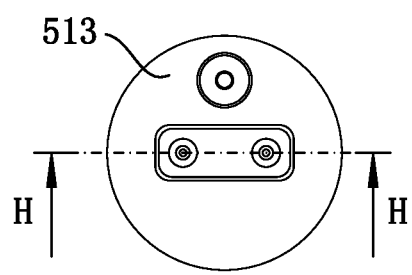
FIG. 27 is a top view schematic diagram of an end cover assembly shown in FIG. 26.
Figure 28:
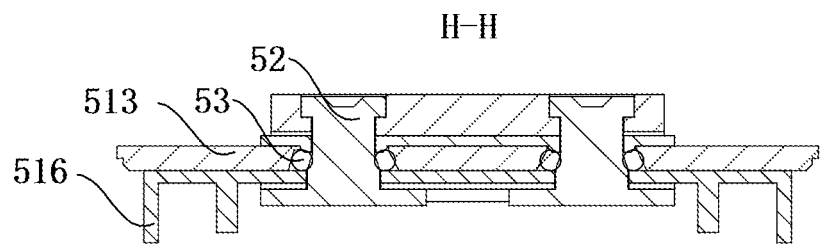
FIG. 28 is a sectional schematic diagram of H-H of FIG. 27.

Please refer to FIG. 26 to FIG. 28, in some embodiments, the installation hole 512 comprises three communicated segments: a second hole segment 512a, a first hole segment 512b and a third hole segment 512c. Wherein the second hole segment 512a is arranged in the first insulating member 514, the first hole segment 512b is arranged in the cover plate 513, and the third hole segment 512c is arranged in the second insulating member 516.

In some embodiments, two installation holes 512 are available, and each installation hole 512 corresponds to one terminal main body 521 of the terminal assembly 52. The terminal assembly 52 comprises a terminal main body 521 and a terminal extending part 522. The terminal main body 521 penetrates through the installation hole 512. Two terminal extending parts 522 is available, and two terminal extending parts 522 are respectively arranged on an end, along the axial direction, of the terminal main body 521, that is, the first terminal extending part 522a and the second terminal extending part 522b are respectively arranged at two sides, along the axial direction, of the cover assembly 51.

Please refer to FIG. 26 and FIG. 28, the first connected flow channel 54 is arranged on the surface, facing towards the first insulating member 514, of the first terminal extending part 522a. The first connected flow channel 54 is configured to be a groove, that is, the first connected flow channel 54 faces towards the cover plate 513, and the concave direction of the first connected flow channel 54 means that the first connected flow channel 54 is concave towards the direction far away from the cover plate 513.

In some embodiments, one end of the first connected flow channel 54 is communicated with the installation hole 512, and extends to the edge of the first terminal extending part 522a towards the direction far away from the installation hole 512.

In some other embodiments, a first connected flow channel 54 is arranged on any one, any arbitrary number or all of the surfaces selected from the surface, facing towards the first terminal extending part 522a of the cover plate 513 and surfaces of two sides of the first insulating member 514. One end of the first connected flow channel 54 is communicated with the installation hole 512, and extends to the edge or the outside of the first terminal extending part 522a towards the direction far away from the installation hole 512.

In these embodiments in which the first connected flow channel 54 is arranged in the first terminal extending part 522a, for the setting number, arrangement manner, length, width and depth of the first connected flow channel 54, please refer to the introduction in the text above, and they are all applicable as long as no conflict exists, therefore, they will not be repeated redundantly herein.

In some other embodiments, the cover assembly 51 comprises a cover plate 513, but does not comprise the first insulating member 514 and the second insulating member 516. In these embodiments, a first connected flow channel 54 is arranged on the surface, facing towards the second extending part 522b, of the cover plate 513.

The implementation manner when the terminal assembly 52 is a single pole is introduced below.

Figure 29:
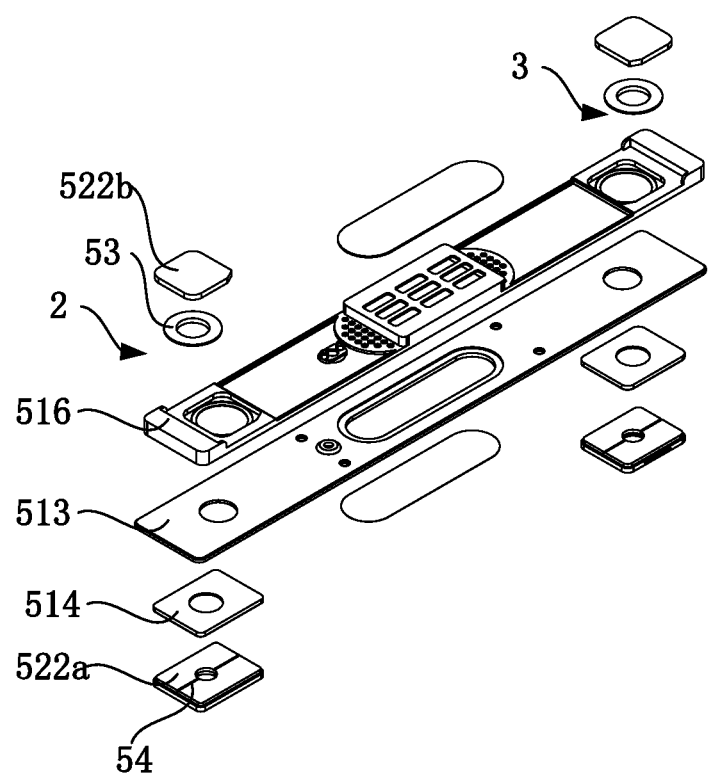
FIG. 29 is an exploded schematic diagram of a single-pole end cover assembly in which a first connected flow channel is arranged in the first extending part provided in some embodiments of the present disclosure.
Figure 30:
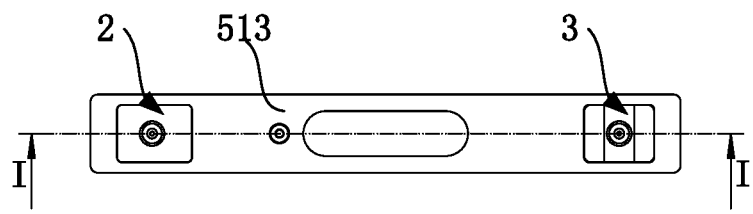
FIG. 30 is a top view schematic diagram of an end cover assembly shown in FIG. 29.
Figure 31:
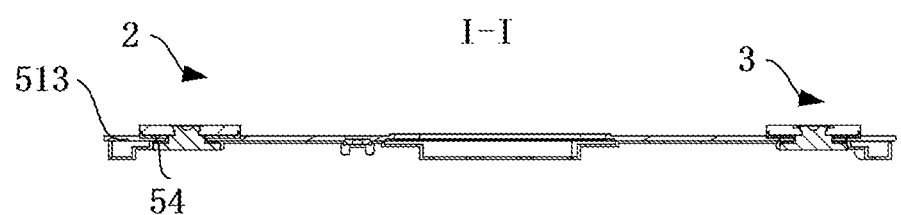
FIG. 31 is a sectional schematic diagram of I-I of FIG. 30.

Please refer to FIG. 29 to FIG. 31, in some embodiments, the end cover assembly 5 comprises a cover assembly 51, a terminal assembly 52, a sealing piece 53 and a first connected flow channel 54. The terminal assembly 52 comprises a terminal main body 521, and is thus a single-pole end cover assembly 5. Please refer to FIG. 29, the electrode assembly 4 corresponding to the end cover assembly 5 of the present embodiment adopts a laminated electrode assembly 4.

The cover plates 513 of the positive terminal assembly 52 and the negative terminal assembly 52 and the second insulating member 516 are connected as a whole. The structures of other parts of the positive terminal assembly 52 and the negative terminal assembly 52 are similar. For the structures of the positive terminal assembly 52 and the negative terminal assembly 52, please refer to the end cover assembly 5 introduced herein.

Please refer to FIG. 29 to FIG. 31, and the end cover assembly 5 comprises a cover assembly 51, a terminal assembly 52, a sealing piece 53 and a first connected flow channel 54.

With the direction illustrated in FIG. 29 as an example, the cover assembly 51 comprises a first insulating member 514, a cover plate 513 arranged below the first insulating member 514, and a second insulating member 516 arranged below the cover plate 513. The cover assembly 51 is provided with an installation hole 512, and the installation hole 512 penetrates through the cover assembly 51 along the axial direction of the installation hole 512. That is, the installation hole 512 penetrates through the first insulating member 514, the cover plate 513 and the second insulating member 516.

Still refer to FIG. 29, the installation hole 512 comprises three communicated segments: a second hole segment 512a, a first hole segment 512b and a third hole segment 512c. Wherein the second hole segment 512a is arranged in the first insulating member 514, the first hole segment 512b is arranged in the cover plate 513, and the third hole segment 512c is arranged in the second insulating member 516. One installation hole 512 is available, to correspond to a single-pole structure of the terminal assembly 52.

Please refer to FIG. 29 to FIG. 31, the first insulating member 514 adopts a rectangular thin-plate structure. The second hole segment 512a is arranged in the first insulating member 514. It is understood that, in those embodiments illustrated in FIG. 29 to FIG. 31, although the first insulating member 514 is not provided with a first connected flow channel 54, however, in some other embodiments, the first insulating member 514 is provided with a first connected flow channel 54. The first connected flow channel 54 is arranged on the surface, facing towards the second extending part 522b, of the first insulating member 514, that is, the upper surface illustrated in FIG. 29; or, the first connected flow channel 54 is arranged on the surface, facing towards the cover plate 513, of the first insulating member 514, that is, the lower surface illustrated in FIG. 29; or, the upper and lower surfaces of the first insulating member 514 are both provided with a first connected flow channel 54.

Please refer to FIG. 29 to FIG. 31, the cover plate 513 is arranged between the first insulating member 514 and the second insulating member 516, and the second insulating member 516 and the first insulating member 514 jointly clamp the cover plate 513. The second insulating member 516 is arranged on a side, facing towards the electrode assembly 4, of the cover plate 513, and the first insulating member 514 is arranged on a side, far away from the electrode assembly 4, of the cover plate 513. The cover plate 513 is configured to be a rectangular thin plate. The cover plate 513 is provided with a first hole segment 512b of the installation hole 512, and the first hole segment 512b is configured to install the sealing piece 53 and the terminal main body 521.

Please refer to FIG. 29 to FIG. 31, the sealing piece 53 adopts a T-shaped sealing ring. The sealing piece 53 comprises an annular part 531 and a sealing part 532, and the annular part 531 is in sealed connection with the sealing part 532. The annular part 531 is arranged in the first hole segment 512b of the installation hole 512, the sealing part 532 is arranged outside the installation hole 512, and the sealing part 532 is pressed tightly by the second terminal extending part 522b of the terminal assembly 52 and the cover plate 513. The sealing part 532 is flat, or is provided with steps, and the sealing part 532 plays a role of sealing. A certain gap exists between the annular part 531 and the inner wall of the first hole segment 512b of the installation hole 512 and the outer wall of the terminal main body 521. The first extending part 522a and the cover assembly 51 jointly squeeze the sealing piece 53 to seal the installation hole 512.

The second insulating member 516, the first insulating member 514 and the sealing piece 53 jointly match to insulate and isolate the cover plate 513 and the terminal main body 521, and prevent short circuit of the terminal main body 521 and the cover plate 513, and realize firm installation of the terminal main body 521.

Please refer to FIG. 29 to FIG. 31, the first connected flow channel 54 is arranged on the surface, facing towards the first insulating member 514, of the cover plate 513, that is, the upper surface of the cover plate 513. Or, the first connected flow channel 54 is arranged on the surface, facing towards the second insulating member 516, of the cover plate 513, that is, the lower surface of the cover plate 513. Or, the upper and lower surfaces of the cover plate 513 are both provided with a first connected flow channel 54.

Or, the first connected flow channel 54 is arranged on the surface, facing towards the first extending part 522a, of the first insulating member 514, and is configured to be a groove, that is, the first connected flow channel 54 is arranged on the upper surface of the first insulating member 514. Or, the first connected flow channel 54 is arranged on the surface, facing towards the cover plate 513, of the first insulating member 514, and is configured to be a groove, that is, the first connected flow channel 54 is arranged on the lower surface of the first insulating member 514. Or, a first connected flow channel 54 is arranged on the upper and lower surfaces of the first insulating member 514.

It should be noted that, the first connected flow channels 54 on the first insulating member 514 and the cover plate 513 are independent and do not influence each other. In some embodiments the first connected flow channel 54 is arranged simultaneously on the first insulating member 514 and the cover plate 513, in other embodiments the first connected flow channel 54 is only arranged on one of the first insulating member 514 and the cover plate 513.

In these embodiments in which the sealing piece 53 adopts a T-shaped sealing ring, for the setting number, arrangement manner, length, width and depth of the first connected flow channel 54, please refer to the introduction in the text above, which will not be repeated redundantly herein.

In some other embodiments, the cover assembly 51 comprises a cover plate 513, but does not comprise the first insulating member 514 and the second insulating member 516. In these embodiments, a first connected flow channel 54 is arranged on the surface, facing towards the second extending part 522b, of the cover plate 513. The first connected flow channel 54 is arranged on the surface, adjacent to the second extending part 522b, of the cover plate 513, and is configured to be a concave groove. Moreover, the second extending part 522b is also provided with or not provided with a first connected flow channel 54.

In some embodiments, one end 54' of the first connected flow channel 54 is communicated with the installation hole 512, and the other end 54" of the first connected flow channel 54 extends to the outside of the first terminal extending part 522a.

It should be noted that, in each embodiment introduced in the text above, the solution in which the terminal assembly 52 is provided with a first connected flow channel 54 and the solution in which the cover assembly 51 is provided with a first connected flow channel 54 is arbitrarily superimposed and combined as long as the solutions are not conflicted with each other.

Figure 33:
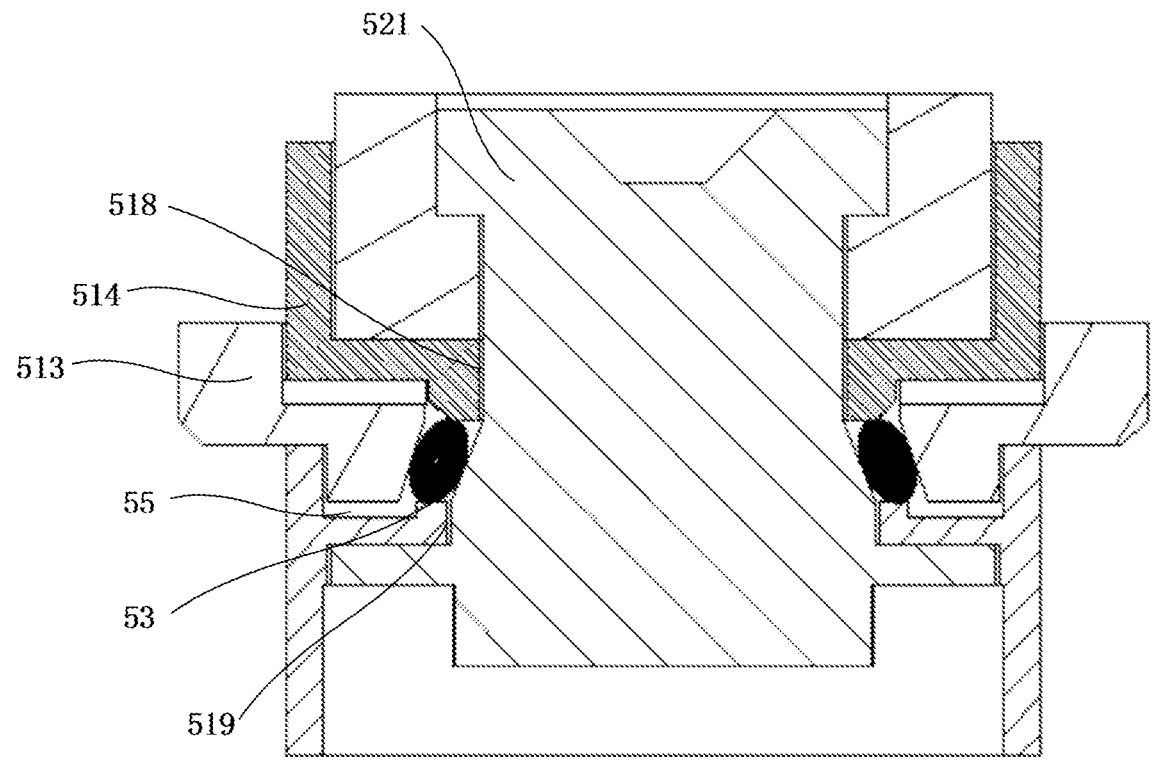
FIG. 33 is a partial enlarged schematic diagram of an end cover assembly in which a sealing ring is a T-shaped ring provided in other embodiments of the present disclosure.
Figure 34:
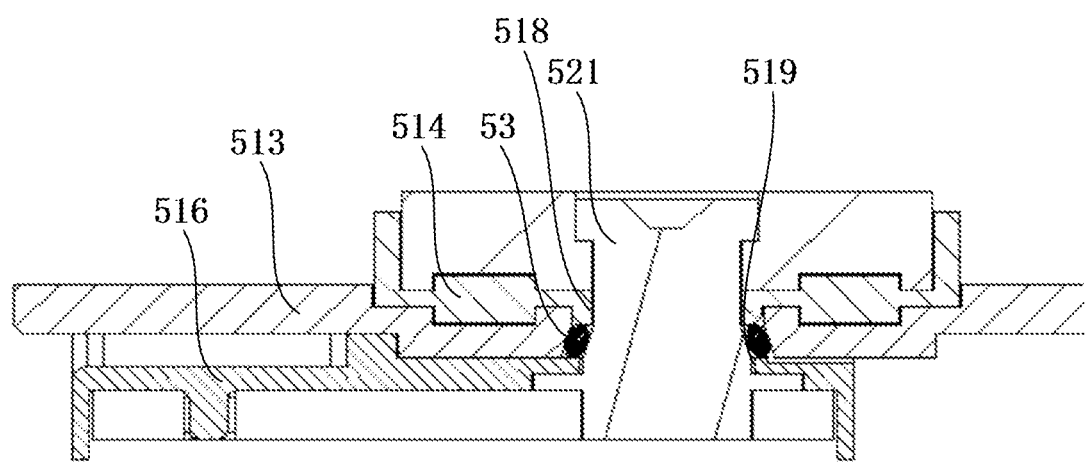
FIG. 34 is a three-dimensional schematic diagram of an end cover assembly provided in some embodiments of the present disclosure.

Please refer to FIG. 33 to FIG. 34, in some embodiments, the sealing piece 53 is arranged between the terminal main body 521 and the hole wall of the first hole segment 512b, that is, the sealing piece 53 adopts a O-shaped ring. The end cover assembly further comprises a second connected flow channel 55. The second connected flow channel 55 is arranged in at least one of the second terminal extending part 522b and the second insulating member 516, or, the second connected flow channel 55 is arranged between the second insulating member 516 and the cover plate 513. Wherein, the second connected flow channel 55 is configured to enable the inside of the housing 1 to be communicated with the third hole segment 512c. In the battery cell, two types o false sealing may exist, one type is the false sealing which enables the installation hole 512 to be incapable of communicating with the environment outside the battery cell, and the second type is false sealing which enables the installation hole 512 to be incapable of communicating with the inner cavity of the battery cell. The setting of the second connected flow channel 55 breaks false sealing which may possibly exist at each contact position between the installation hole 512 and the inner cavity of the battery cell. False sealing may be formed in the surfaces inside the battery housing in the joint surface of each part of the cover assembly 51 and the joint surface between the cover assembly 51 and the second terminal extending part 522b, and a second connected flow channel 55 is arranged in all these positions. In other words, the second connected flow channel 55 is arranged in any position, at which false sealing may be possibly formed due to contact coordination, inside the housing of the battery cell.

Figure 35:
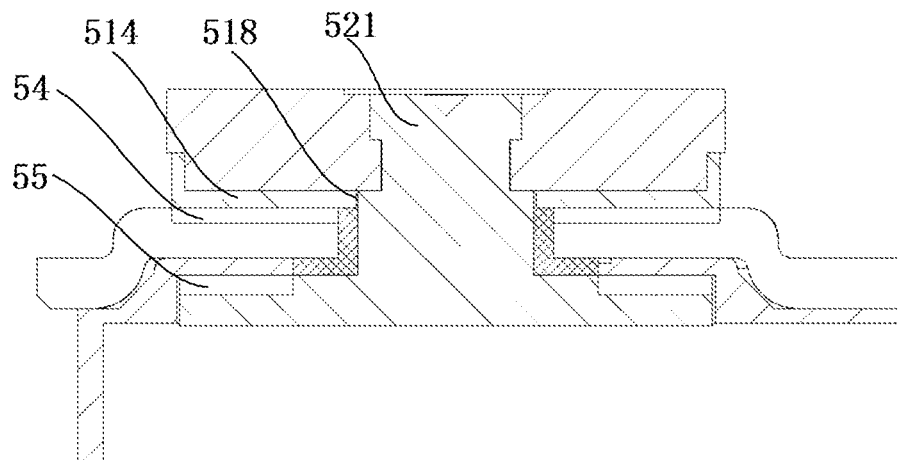
FIG. 35 is a structural schematic diagram of an end cover assembly provided in other embodiments of the present disclosure.
Figure 36:
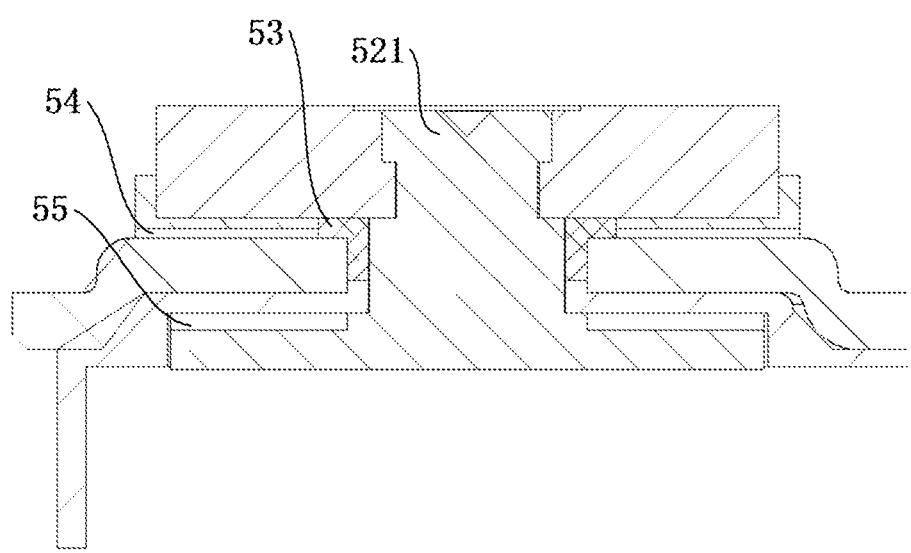
FIG. 36 is a structural schematic diagram of an end cover assembly provided in some embodiments of the present disclosure.

Please refer to FIG. 35 to FIG. 36, in some embodiments, the sealing piece 53 adopts a T-shaped sealing ring. At least part of the sealing piece 53 is arranged between the second terminal extending part 522b and the hole wall 512c' of the third hole segment 512c. The end cover assembly further comprises a second connected flow channel 55, and the second connected flow channel 55 is arranged in at least one of the second terminal extending part 522b and the second insulating member 516, to break the sealing between the second terminal extending part 522b and the second insulating member 516, such that the inside of the housing 1 is communicated with the third hole segment 512c. The structure of the second connected flow channel 55 is set according to requirements, and the size is determined by the structure of the battery cell.

In some embodiments in which the second connected flow channel 55 is arranged, the end cover assembly further comprises a second penetrating structure 519, and the second penetrating structure 519 is arranged between the second insulating member 516 and the terminal main body 521, to break the sealing between the second insulating member 516 and the terminal main body 521. Or, the first penetrating structure 518 is a through hole with the aperture being slightly greater than the aperture of the third hole segment 512c.

The setting of the second penetrating structure 519 increases the gap between the second insulating member 516 and the terminal main body 521, such that false sealing between the two is difficult to form.

In some embodiments, the second penetrating structure 519 penetrates through the hole wall of the third hole segment 512c along an axial direction, and is configured to be a concave part which is concave towards the direction far away from the terminal main body 521. The number of the concave part is one or multiple. The shape and size of the concave part is both set according to requirements. A plurality of concave parts are connected together or arranged at intervals.

In each embodiment introduced in the text above, the terminal main body 521 is electrically connected with the electrode assembly 4 through the switching piece 517. The implementation manner of the switching piece 517 introduced herein is applicable to each embodiment in the text above. The switching part 517 comprises a first connecting part, a second connecting part and a third connecting part. The first connecting part is connected with the third connecting part through the second connecting part. The first connecting part, the second connecting part and the third connecting part are of a whole or fixed together. The third connecting part is fixed with the terminal main body 521. After the battery cell 10 is installed, the first connecting part of the switching piece 517 is in a bending state, and the first connecting part is bent to a position which is roughly in parallel with the third connecting part. The first connecting part is electrically connected with the polar ear 40 of the electrode assembly 4.

The end cover assembly 5 introduced in the text above is simultaneously applicable to the positive electrode terminal and the negative electrode terminal. Moreover, the implementation manners of the positive end cover assembly 2 and the negative end cover assembly 3 do not influence each other and are independent mutually. For example, the positive end cover assembly 2 is provided with the first connected flow channel 54, and the negative end cover assembly 3 is not provided with the first connected flow channel 54; or the setting position, number and arrangement manner of the first connected flow channels 54 of the positive end cover assembly 2 and the negative end cover assembly 3 are the same or different.

Figure 32:
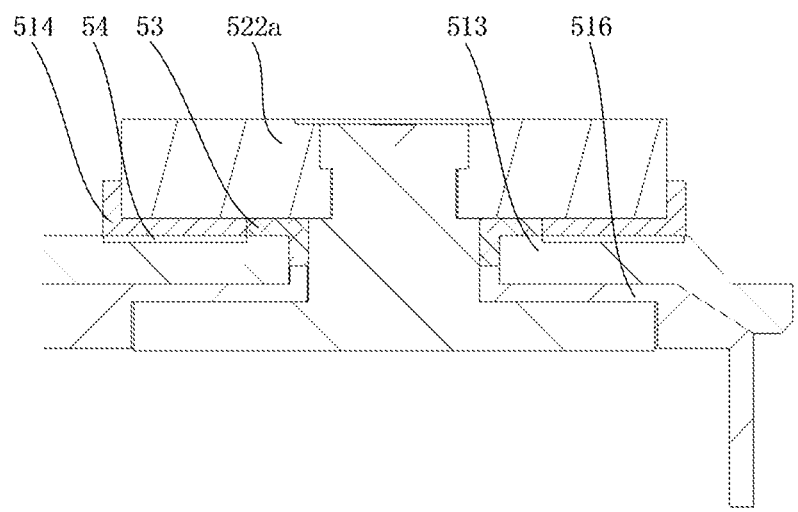
FIG. 32 is a partial enlarged schematic diagram of an end cover assembly in which a sealing ring is a T-shaped ring provided in another embodiment of the present disclosure.

Please refer to FIG. 32, in some other embodiments, the sealing piece 53 adopts a T-shaped ring. The cover plate 513 is provided with a first connected flow channel 54. When no sealing ring 53 is available or the sealing ring 53 is invalid, the first connected flow channel 54 enables the inside and the outside of the battery cell 10 to be communicated, under this condition, when sealing performance detection is performed on the battery cell 10, whether the battery cell 10 leaks are detected through the first connected flow channel 54, thereby avoiding subsequent hidden dangers caused by false sealing of the end cover assembly 5 of the battery cell 10.

In still some other embodiments, the sealing piece 53 adopts a T-shaped ring. The cover plate 513 is provided with a first connected flow channel 54. When no sealing ring 53 is available or the sealing ring 53 is invalid, the first connected flow channel 54 enables the inside and the outside of the battery cell 10 to be communicated, under this condition, when sealing performance detection is performed on the battery cell 10, whether the battery cell 10 leaks will be detected through the first connected flow channel 54, thereby avoiding subsequent hidden dangers caused by false sealing of the end cover assembly 5 of the battery cell 10.

Please refer to FIG. 34, in some embodiments, the end cover assembly further comprises a first penetrating structure 518, the first penetrating structure 518 is arranged between the first insulating member 514 and the terminal main body 521, and the first connected flow channel 54 is communicated with the first hole segment 512b through the first penetrating structure 518. The first penetrating structure 518 is configured to break the false sealing between the first insulating member 514 and the terminal main body 521. The first penetrating structure 518 is configured to break the false sealing between the cover assembly 51 and the terminal main body 521. This type of false sealing is mainly caused when the cover assembly 51 adopts a plastic material. During assembly, fit similar to interference fit is formed between the installation hole 512 of the cover assembly 5 and the terminal main body 521, or interference fit is formed in part of the area, which may both lead to false sealing. The setting of the first penetrating structure 518 enables the installation gap between the cover assembly 51 and the terminal main body 521 to be bigger.

The first penetrating structure 518 has a plurality of implementation manners, in some embodiments, the first penetrating structure 518 penetrates through the hole wall of the second hole segment 512a along an axial direction, and the first penetrating structure 518 is configured to be a concave part which is concave towards the direction far away from the terminal main body 521. A plurality of first penetrating structures 518 are arranged along the circumferential direction of the first hole segment 512b, and the spacing between each of the first penetrating structures 518 is equal or slightly different. The width size of the first penetrating structure 518 is adapted to the size of the second hole segment 512a of the first insulating assembly 514. Or, the first penetrating structure 518 is a through hole with the aperture being slightly greater than the aperture of the second hole segment 512a.

Embodiments of the present disclosure further provide a manufacturing device of a battery cell, comprising a housing providing module and an end cover providing module. The housing providing module is configured to provide a housing 1, and the housing 1 is provided with an opening; the end cover providing module is configured to provide an end cover assembly, and the end cover assembly closes the opening. Wherein the end cover assembly comprises a cover assembly 51, a terminal assembly 52, a sealing piece 53 and a first connected flow channel 54. The cover assembly 51 is provided with an installation hole 512, and the installation hole 512 penetrates through the cover assembly 51 along the axial direction of the installation hole 512. The terminal assembly 52 is installed in the installation hole 512; and the sealing piece 53 is configured to seal the installation hole 512. The first connected flow channel 54 is arranged in the terminal assembly 52 and/or the cover assembly 51. The first connected flow channel 54 is constructed as follows: when the sealing of the sealing piece 53 is invalid, the first connected flow channel 54 enables the inside and the outside of the housing 1 to be communicated through the installation hole 512. For detailed introduction of the end cover assembly, please refer to the text above, which will not be repeated redundantly herein.

Still another embodiment of the present disclosure provides a manufacturing method of a battery cell, configured to manufacture the battery cell introduced in the text above. The method comprises the following steps:

Firstly, providing a housing 1, wherein the housing 1 is provided with an opening.

Secondly, providing an end cover assembly, wherein the end cover assembly closes the opening of the housing 1. The end cover assembly comprises a cover assembly 51, a terminal assembly 52, a sealing piece 53 and a first connected flow channel 54. The cover assembly 51 is provided with an installation hole 512, and the installation hole 512 penetrates through the cover assembly 51 along an axial direction of the installation hole 512. The terminal assembly 52 is installed in the installation hole 512. The sealing piece 53 is configured to seal the installation hole 512. The first connected flow channel 54 is arranged in the terminal assembly 52 and/or the cover assembly 51. The first connected flow channel 54 is constructed as follows: when the sealing of the sealing piece 53 is invalid, the first connected flow channel 54 enables the inside and the outside of the housing 1 to be communicated through the installation hole 512.

In the description of the present disclosure, it should be understood that, the orientation or positional relationship indicated by such terms as "center" "longitudinal", "lateral", "front", "rear", "left", "right", "vertical", "horizontal", "top", "bottom", "inner" and "outer" is the orientation or positional relationship based on the accompanying drawings. Such terms are merely for the convenience of description of the present disclosure and simplified description, rather than indicating or implying that the device or element referred to must be located in a certain orientation or must be constructed or operated in a certain orientation, thereby the terms cannot be understood as a limitation to the protection scope of the present disclosure.

Finally, it should be noted that, the above embodiments are merely for illustrating the technical solutions of the present disclosure, rather than for limiting the present disclosure. Although the present disclosure is described in detail with reference to preferred embodiments, those skilled in the art should understand that, specific embodiments of the present disclosure can still be modified or part of the technical solutions can be equivalently substituted; while all the modifications or equivalent substitutions made without departing from the spirit of the technical solutions of the present disclosure shall all fall within the scope of the technical solutions claimed in the present disclosure.

The invention claimed is:

1. An end cover assembly configured to close a housing of a battery cell, comprising:
   a cover assembly, provided with an installation hole, wherein the installation hole penetrates through the cover assembly along an axial direction of the installation hole;
   a terminal assembly, installed in the installation hole;
   a sealing piece, configured to seal the installation hole; and
   a first connected flow channel arranged in at least one of the terminal assembly and the cover assembly,
   wherein the terminal assembly comprises a terminal main body and a first terminal extending part, the terminal main body penetrates through the installation hole; and the first terminal extending part extends outwards from the peripheral surface of the terminal main body, and is fixed on an outer side, along the axial direction, of the cover assembly,
   wherein the cover assembly comprises a cover plate and a first insulating member, wherein at least part of the first insulating member is arranged between the first terminal extending part and the cover plate,
   wherein the installation hole comprises a first hole segment and a second hole segment, wherein the first hole segment penetrates through the cover plate along the axial direction, and the second hole segment is communicated with the first hole segment and penetrates through the first insulating member along the axial direction,
   wherein at least part of the sealing piece is arranged between the terminal main body and a hole wall of the second hole segment, and along the axial direction, the first terminal extending part and the cover plate jointly squeeze the part of the sealing piece arranged between the terminal main body and the hole wall of the second hole segment, wherein the first connected flow channel is concavely-formed between the first insulating member and the cover plate on a cover-plate-facing surface of the first insulating member or on a first-insulating-member-facing surface of the cover plate; and/or, the first connected flow channel is concavely-formed between the first insulating member and the first terminal extending part on a first-terminal-extending-part-facing surface of the first insulating member or on a first-insulating-member-facing surface of the first terminal extending part, wherein the first connected flow channel is an elongated channel having in an elongated direction a first end and a second end, the first end connecting with the second hole segment, and the second end connecting with outside of the housing, wherein the first connected flow channel allows fluid to flow between the outside of the housing and the second hole segment through the first end and the second end, and wherein when the sealing piece is leaking, the first connected flow channel is configured to allow fluid leaking through the sealing piece to pass through the first end and the second end of the first connected flow channel.

2. The end cover assembly as claimed in claim 1, wherein the first connected flow channel is configured to be a groove or a rough surface.

3. The end cover assembly as claimed in claim 1, wherein the terminal assembly further comprises a second terminal extending part which extends outwards from the peripheral surface of the terminal main body and the second terminal extending part is fixed on the inner side, along the axial direction, of the cover plate, wherein the cover assembly further comprises a second insulating member, and at least part of the second insulating member is arranged between the second terminal extending part and the cover plate, and wherein the installation hole further comprises a third hole segment, and the third hole segment is communicated with the first hole segment and penetrates through the second insulating member along the axial direction.

4. The end cover assembly as claimed in claim 3, further comprising:

a penetrating structure, arranged between the second insulating member and the terminal main body.

5. The end cover assembly as claimed in claim 4, wherein the penetrating structure penetrates through a hole wall of the third hole segment along an axial direction, and is configured to be concave.

6. A battery cell, comprising a housing and the end cover assembly claimed in claim 1, wherein the housing is provided with an opening, and the end cover assembly closes the opening.

7. A battery pack, comprising the battery cell according to claim 6.

* * * * *